(12) United States Patent
Bauchot et al.

(10) Patent No.: US 9,659,194 B2
(45) Date of Patent: May 23, 2017

(54) DIVIDING TAGGED ITEMS INTO SUBSETS

(75) Inventors: Frederic Bauchot, Saint-Jeannet (FR); Jean-Yves Clement, Saint-Jeannet (FR); Gerard Marmigere, Drap (FR); Joaquin Picon, Cezanne (FR)

(73) Assignee: International Business Machines Corporation, Armonk, NY (US)

( * ) Notice: Subject to any disclaimer, the term of this patent is extended or adjusted under 35 U.S.C. 154(b) by 1555 days.

(21) Appl. No.: 12/336,594

(22) Filed: Dec. 17, 2008

(65) Prior Publication Data
US 2009/0160622 A1   Jun. 25, 2009

(30) Foreign Application Priority Data

Dec. 20, 2007   (EP) .................................... 07301721

(51) Int. Cl.
G06K 7/00    (2006.01)
G06K 7/10    (2006.01)
G06K 17/00   (2006.01)

(52) U.S. Cl.
CPC ....... *G06K 7/0008* (2013.01); *G06K 7/10079* (2013.01); *G06K 17/0029* (2013.01);
(Continued)

(58) Field of Classification Search
USPC .................. 340/1.1, 10.1–10.6, 572.1–572.9; 235/375–385
See application file for complete search history.

(56) References Cited

U.S. PATENT DOCUMENTS 4,237,536 A   12/1980   Enelow et al.
4,441,288 A    4/1984   Feldman et al.
(Continued)

FOREIGN PATENT DOCUMENTS

CA    2417616        7/2002
JP    2000018947     6/1998
(Continued)

OTHER PUBLICATIONS

Wang et al.; A Novel Solution to the Reader Collision Problem in RFID System; 2006 IEEE; 4 pages.
(Continued)

*Primary Examiner* — James Yang
(74) *Attorney, Agent, or Firm* — Schmeiser, Olsen & Watts LLP; John Pivnivhny

(57) ABSTRACT

A method and system for dividing a set of tagged items into subsets. Each tagged item is tagged with a passive RFID tag. A RFID reader is instructed to poll the RFID tags of all tagged items in a specified region having fixed boundaries to generate information including, for each tagged item, a spatial location of each tagged item and a list of all other tagged items in the region which are adjacent to each tagged item. The region is split into non-overlapping subregions. For each subregion, a central tagged item having more adjacent tagged items in each subregion than any other tagged item in each subregion is determined, utilizing the generated information. A virtual boundary is outlined around the central tagged item to enclose the central tagged item and a portion of the tagged items in each subregion which are adjacent to the central tagged item.

20 Claims, 10 Drawing Sheets

(52) U.S. Cl.
CPC ............. *H04Q 2213/13095* (2013.01); *H04Q 2213/13098* (2013.01)

(56) References Cited

U.S. PATENT DOCUMENTS

| | | | |
|---|---|---|---|
| 4,614,945 | A | 9/1986 | Brunius et al. |
| 4,625,473 | A | 12/1986 | Peterson et al. |
| 5,111,184 | A | 5/1992 | Heaton et al. |
| 5,512,879 | A | 4/1996 | Stokes |
| 5,521,601 | A | 5/1996 | Kandlur et al. |
| 5,528,222 | A | 6/1996 | Moskowitz et al. |
| 5,541,577 | A | 7/1996 | Cooper et al. |
| 5,646,592 | A | 7/1997 | Tuttle |
| 5,774,876 | A | 6/1998 | Woolley et al. |
| 5,804,810 | A * | 9/1998 | Woolley ............. G01S 5/0289 235/375 |
| 5,825,298 | A | 10/1998 | Walter |
| 5,959,568 | A | 9/1999 | Woolley |
| 6,025,780 | A | 2/2000 | Bowers et al. |
| 6,031,457 | A | 2/2000 | Bonkowski et al. |
| 6,104,337 | A | 8/2000 | Coutts et al. |
| 6,137,413 | A | 10/2000 | Ryan |
| 6,255,959 | B1 | 7/2001 | Lake et al. |
| 6,271,753 | B1 | 8/2001 | Shukla |
| 6,275,157 | B1 | 8/2001 | Mays et al. |
| 6,424,264 | B1 | 7/2002 | Giraldin et al. |
| 6,515,591 | B2 | 2/2003 | Lake et al. |
| 6,662,642 | B2 | 12/2003 | Breed et al. |
| 6,720,866 | B1 | 4/2004 | Sorrells et al. |
| 6,844,816 | B1 | 1/2005 | Melton et al. |
| 6,882,284 | B2 | 4/2005 | Lake et al. |
| 6,960,999 | B2 | 11/2005 | Haimovitch et al. |
| 7,002,461 | B2 | 2/2006 | Duncan et al. |
| 7,042,357 | B2 | 5/2006 | Girvin et al. |
| 7,081,820 | B2 | 7/2006 | Minarovic |
| 7,098,794 | B2 | 8/2006 | Lindsay et al. |
| 7,119,690 | B2 | 10/2006 | Lerch et al. |
| 7,151,455 | B2 | 12/2006 | Lindsay et al. |
| 7,170,412 | B2 | 1/2007 | Knox et al. |
| 7,176,796 | B2 | 2/2007 | Chen et al. |
| 7,382,262 | B2 | 6/2008 | Commagnac et al. |
| 7,382,266 | B2 | 6/2008 | Minarovic |
| 7,383,053 | B2 | 6/2008 | Kent et al. |
| 7,791,484 | B2 | 9/2010 | Commagnac et al. |
| 7,812,719 | B2 | 10/2010 | Djuric et al. |
| 7,962,150 | B2 | 6/2011 | Hertzog et al. |
| 8,199,689 | B2 * | 6/2012 | Maltseff ............. G06K 7/10237 340/10.1 |
| 8,207,820 | B2 | 6/2012 | Bauchot et al. |
| 8,289,129 | B2 | 10/2012 | Bauchot et al. |
| 8,289,167 | B2 | 10/2012 | Bauchot et al. |
| 8,362,877 | B2 | 1/2013 | Bauchot et al. |
| 8,610,581 | B2 | 12/2013 | Bauchot et al. |
| 2001/0008390 | A1 | 7/2001 | Berquist et al. |
| 2002/0073915 | A1 | 6/2002 | Howard |
| 2002/0109607 | A1 | 8/2002 | Cumeralto et al. |
| 2003/0099158 | A1 | 5/2003 | De la Huerga |
| 2003/0234193 | A1 | 12/2003 | Clouse |
| 2003/0234293 | A1 | 12/2003 | Sauve et al. |
| 2004/0066296 | A1 | 4/2004 | Atherton |
| 2004/0108954 | A1 | 6/2004 | Richley et al. |
| 2004/0212480 | A1 * | 10/2004 | Carrender ............. G06K 7/0008 340/10.42 |
| 2005/0068169 | A1 | 3/2005 | Copley et al. |
| 2005/0092072 | A1 | 5/2005 | Wollenberg et al. |
| 2005/0093702 | A1 * | 5/2005 | Twitchell ............. G06K 7/0008 340/572.8 |
| 2005/0203681 | A1 | 9/2005 | Minor |
| 2006/0066444 | A1 * | 3/2006 | Steeves ............. G06K 7/10108 340/10.5 |
| 2006/0092072 | A1 | 5/2006 | Steiner |
| 2006/0111123 | A1 | 5/2006 | Nerat |
| 2006/0162207 | A1 | 7/2006 | Morton et al. |
| 2006/0208887 | A1 | 9/2006 | Fields et al. |
| 2006/0220955 | A1 | 10/2006 | Hamilton |
| 2006/0238341 | A1 | 10/2006 | Commagnac et al. |
| 2007/0001809 | A1 | 1/2007 | Kodukula et al. |
| 2007/0013541 | A1 | 1/2007 | Harazin et al. |
| 2007/0052539 | A1 | 3/2007 | Brown |
| 2007/0080783 | A1 | 4/2007 | Ghosh et al. |
| 2007/0115125 | A1 | 5/2007 | Lyon et al. |
| 2007/0126579 | A1 | 6/2007 | Adams et al. |
| 2007/0126583 | A1 | 6/2007 | Minawa et al. |
| 2007/0247366 | A1 | 10/2007 | Smith et al. |
| 2007/0285245 | A1 | 12/2007 | Djuric et al. |
| 2007/0288995 | A1 * | 12/2007 | Terada ............. H04L 63/107 726/2 |
| 2007/0290924 | A1 | 12/2007 | McCoy |
| 2008/0061939 | A1 | 3/2008 | Davis et al. |
| 2008/0211676 | A1 | 9/2008 | Commagnac et al. |
| 2008/0261615 | A1 | 10/2008 | Kalhan |
| 2009/0160603 | A1 | 6/2009 | Bauchot et al. |
| 2009/0201154 | A1 | 8/2009 | Bauchot et al. |
| 2009/0315679 | A1 | 12/2009 | Bauchot et al. |
| 2009/0315685 | A1 | 12/2009 | Bauchot et al. |
| 2012/0218088 | A1 | 8/2012 | Bauchot et al. |
| 2012/0326872 | A1 | 12/2012 | Bauchot et al. |

FOREIGN PATENT DOCUMENTS

| | | |
|---|---|---|
| JP | 20011205387 | 7/2001 |
| JP | 2002216086 | 8/2002 |
| JP | 2003141649 | 5/2003 |
| JP | 92004292120 | 10/2004 |
| JP | 2005263480 | 9/2005 |
| JP | 2006117413 | 5/2006 |
| JP | 2006199477 | 8/2006 |
| JP | 2006309592 | 11/2006 |
| JP | 2007219730 | 8/2007 |
| KR | 20030067372 | 8/2003 |
| KR | 1020040018301 A | 3/2004 |
| KR | 20050116587 | 12/2005 |
| KR | 20070010340 A | 1/2007 |
| WO | 0077344 | 12/2000 |
| WO | WO0106444 | 1/2001 |
| WO | 02077939 | 10/2002 |
| WO | 2005027079 | 3/2005 |
| WO | 2006105381 | 10/2006 |
| WO | 2007002941 | 1/2007 |
| WO | 2007006085 | 1/2007 |
| WO | 2007041153 | 4/2007 |
| WO | 2007060619 | 5/2007 |
| WO | 2007064747 | 6/2007 |

OTHER PUBLICATIONS

Pillai et al.; Using Volatile State Storage for Substantial Improvement in RFID Throughput; 5 pages.
U.S. Appl. No. 12/335,601, filed Dec. 16, 2008; First Named Inventor Frederic Bauchot.
O'Connor, Mary Catherine, Aethon Adds RFID to Robotic Hopsital Helpers, RFID Journal—RFID (Radio Frequency Identification) Technology News & Features; Retrieved from the Internet: < URL: http://www.rfidjournal.com/article/articleview/3330/1/1/ > [Retrieved Feb. 25, 2008]; 3 pages.
Notice of Allowance (Mail Date Aug. 15, 2011) for U.S. Appl. No. 12/180,664, filed Jul. 28, 2008.
U.S. Appl. No. 12/180,664, filed Jul. 28, 2008.
U.S. Appl. No. 12/234,772, filed Sep. 22, 2008.
Office Action (Mail Date Sep. 15, 2011) for U.S. Appl. No. 12/234,772, filed Sep. 22, 2008.
Challstrom, C.W., NOAA Chairperson, Federal Geodetic Control Subcommittee; Input Formats and Specifications of the Geodetic Survey Data Base, Appendix P (The Description Proccessing Handbook); Mar. 2003; Appendix P Updated Mar. 2007, U.S. Dept. of Commerce, NOAA, NGS, Silver Springs MD: http://www.ngs.noaa.gov/FGCS/BlueBook/Sections: 3.3.1.6.7.
Pham, et al.; Kirker-Othmer Encylcopedia of Chemical Technology, vol. 10: Epoxy Resins John Wiley & Songs, Nov. 19, 2004, p. 348, second paragraph; pp. 457-459, Section 21.4 (Other Electrical and Electronica Application) and Section 21.5 (Adhesives).

(56) References Cited

OTHER PUBLICATIONS

Preliminary Amendment filed Dec. 23, 2008 for U.S. Appl. No. 12/306,272, filed Dec. 23, 2008.
Preliminary Amendment filed May 11, 2009 for U.S. Appl. No. 12/306,272, filed Dec. 23, 2008.
Office Action (Mail Date Jan. 19, 2011) for U.S. Appl. No. 12/306,272, filed Dec. 23, 2008.
Amendment filed Apr. 12, 2011 in Response to Office Action (Mail Date Jan. 19, 2011) for U.S. Appl. No. 12/306,272, filed Dec. 23, 2008.
Notice of Allowance (Mail Date May 13, 2011) for U.S. Appl. No. 12/306,272, filed Dec. 23, 2008.
Request for Continued Examination filed Jul. 1, 2011 for U.S. Appl. No. 12/306,272, filed Dec. 23, 2008.
Office Action (Mail Date Aug. 9, 2011) for U.S. Appl. No. 12/306,272, filed Dec. 23, 2008.
Amendment filed Oct. 31, 2011 in Response to Office Action (Mail Date Aug. 9, 2011) for U.S. Appl. No. 12/306,272, filed Dec. 23, 2008.
Office Action (Mail Date Dec. 6, 2011) for U.S. Appl. No. 12/306,272, filed Dec. 23, 2008.
Office Action (Mail Date Jan. 13, 2010) for U.S. Appl. No. 12/109,319, filed Apr. 24, 2008.
Amendment filed Feb. 2010 in Response to Office Action (Mail Date Jan. 13, 2010) for U.S. Appl. No. 12/109,319, filed Apr. 24, 2008.
Notice of Allowance (Mail Date May 11, 2010) for U.S. Appl. No. 12/109,319, filed Apr. 24, 2008.
Office Action—Ex Parte Quayle (Mail Date Oct. 17, 2007) for U.S. Appl. No. 11/406,911, filed Apr. 19, 2006.
Amendment filed Nov. 6, 2007 in Response to Office Action—Ex Parte Quayle (Mail Date Oct. 17, 2007) for U.S. Appl. No. 11/406,911, filed Apr. 19, 2006.
Notice of Allowance (Mail Date Feb. 4, 2008) for U.S. Appl. No. 11/406,911, filed Apr. 19, 2006.
Amendment after Notice of Allowance (Rule 312) filed Feb. 15, 2008 for U.S. Appl. No. 11/406,911, filed Apr. 19, 2006.
Supplemental Notice of Allowance (Mail Date Apr. 9, 2008) for U.S. Appl. No. 11/406,911, filed Apr. 19, 2006.
Amendment filed Dec. 8, 2011 in Response to Office Action (Mail Date Sep. 15, 2011) for U.S. Appl. No. 12/234,772, filed Sep. 22, 2008.
Request for Continued Examined filed Oct. 19, 2011 for U.S. Appl. No. 12/180,664, filed Jul. 28, 2008.
Notice of Allowance (Mail Date Nov. 15, 2011) for U.S. Appl. No. 12/180,664, filed Jul. 28, 2008.
Request for Continued Examined filed Jan. 19, 2012 for U.S. Appl. No. 12/180,664, filed Jul. 28, 2008.
Office Action (Mail Date Jan. 31, 2012) for U.S. Appl. No. 12/335,601, filed Dec. 16, 2008.
Notice of Allowance (Mail Date Jan. 27, 2012) for U.S. Appl. No. 12/180,664, filed Jul. 28, 2008.
Notice of Allowance (Mail Date Sep. 17, 2012) for U.S. Appl. No. 13/418,739, filed Mar. 13, 2012.
Amemdment filed Mar. 5, 2012 in response to Office Action (Mail Date Dec. 6, 2011) for U.S. Appl. No. 12/306,272, filed Dec. 23, 2008.
Final Office Action (Mail Date Apr. 10, 2012) for U.S. Appl. No. 12/306,272, filed Dec. 23, 2008.
U.S. Appl. No. 13/418,739, filed Mar. 13, 2012.
Amendment filed Apr. 26, 2012 in response to Office Action (Mail Date Jan. 31, 2012) for U.S. Appl. No. 12/335,601, filed Dec. 16, 2008.
Notice of Allowance (Mail Date Jun. 6, 2012) for U.S. Appl. No. 12/335,601, filed Dec. 16, 2008.
Amendment filed May 30, 2012 in response to Final Office Action (Mail Date Apr. 10, 2012) for U.S. Appl. No. 12/306,272, filed Dec. 23, 2008.
Notice of Allowance (Mail Date Jun. 14, 2012) for U.S. Appl. No. 12/306,272, filed Dec. 23, 2008.
Notice of Allowance (Mail Date Mar. 20, 2012) for U.S. Appl. No. 12/234,772, filed Sep. 22, 2008.
JPO Office Action, Feb. 4, 2014, a page.

* cited by examiner

DIVIDING TAGGED ITEMS INTO SUBSETS

FIELD OF THE INVENTION

The present invention relates in general to the field of Pallet Management System (PMS) and packaging supply chain logistic, and more particularly to a system and method for determining Radio Frequency Identification (RFID) items located in a delimited volume.

BACKGROUND OF THE INVENTION

When faced with the complexity of item inventory, independently of the business sector, today's warehouses have a common objective of making their packaging supply chain logistic more robust and more efficient. They have to monitor efficiently the items visibly and keep track of the movements of numerous items before being assembled at the case and palletized.

Furthermore, a major objective of the packaging supply chains logistic is to be able to locate and account for item assets throughout their life cycle and provide transaction visibility across logistic systems. Transaction visibility provides an organization with timely and accurate information on the location, movement, status and identity for improving the overall inventory process. Consequently, for achieving such a process performance most of the organizations must also consider how pallet loads created at the warehouse, especially rainbow pallets (pallets of mixed products), will be properly identified and tagged and finally tracked. Generally, to meet these objectives, today's packaging supply chains use the Radio Frequency Identification (RFID) capabilities for optimizing the performance of their overall inventory process. The RFID technology suits the process automation as well as the volume production and matches various business expectations in sectors where numerous items need to be identified by type or/and by physical characteristics and other differentiating parameters.

Even if there are various RFID possibilities available today for monitoring a packaging supply chain, one difficulty resides in identifying heterogeneous tagged items in large areas such as factory or distribution yard at the same time, ensuring that the reading of each tagged item avoids reader collision. A reader collision appears when a signal from one reader interferes with the signal from another reader.

It is also desirable for an organization to implement a robust technique for tracking pallet/case inventories either discretely (i.e. all pallets/cases IDs are recorded and aggregate quantities identified) or more simply quantity by type and to easily identify the content of each pallet either in bulk or as unique IDs.

Independent of the technique, a major concern resides when an organization needs discriminating among a large variety of heterogeneous tagged items already placed on the pallets/cases or not, namely the tagged items that have identification parameters allowing a reader to aggregate them according to their geographical location.

Usually a reader expects to read tagged items confined in a given volume. The given volume, most of the time, represents the volume of the cases stacked on a pallet. Despite the tuning of the reader, the reading of the information on multiple tagged items that are located inside a box or package can be polluted by the unexpected tagged items located in a close proximity also answering to the reader request and therefore introducing errors.

It is also desirable to ensure that a reader is capable of collecting the identification parameters from a series of tags that are assembled together, whether in a box or in a package by avoiding multiple readings as well as by preventing reading collisions.

Another concern is ensuring that the reading is not affected by close proximity of tags responding to the reader thereby generating undesirable electromagnetic radiation to the queried tag.

A technique that is generally adopted for discriminating tagged items in a delimited vicinity is the use of sophisticated RFID directional antennas in combination with tags that are especially designed to have a high gain in controlled environment and orientation (i.e. squiggle tag or I2 tag). Unfortunately, the use of such technique does not avoid the undesirable radiation of the adjacent tags affecting the tag answering to the reader.

To summarize, prior art tools and methods present several drawbacks as follows.

Existing tools and methods do not allow a pallet management system to identify efficiently aggregated tagged items in a delimited vicinity.

Existing tools and methods do not offer the possibility of reading a series of tagged items that are assembled together in a predefined volume, whether in a box or in a package, in cases or/and pallets.

Existing tools and methods do not allow a supply chain to identify a list of tagged items that are located in a delimited vicinity by reading a tag once.

Existing tools and methods do not minimize the reading collision when discriminating a unique tagged item that is close to a series of adjacent tags in the same case and/or pallet.

Exiting tools and methods using sophisticated RFID directional antennas in combination with tags especially designed to have a high gain in controlled environment and orientation do not eliminate efficiently reading collision.

As mentioned above, the known solutions are not fully appropriate to identify aggregated tagged items in a delimited vicinity by avoiding reading collision due to the close proximity of tagged items.

Furthermore, the existing tools and methods do not allow a reader to get in one shot the identification of a list of tagged items that are considered as adjacent by the reader when scanning pallets/cases all along the packaging supply chain process.

The present invention offers a solution to solve the aforementioned problems.

SUMMARY OF THE INVENTION

The present invention provides a method for dividing a set of tagged items into subsets, each tagged item being tagged with a passive Radio Frequency Identification (RFID) tag.

A processor of a computer system instructs a RFID reader to poll the RFID tags of all tagged items in a specified region having fixed boundaries to generate information comprising, for each tagged item in the region, a spatial location of each tagged item and a list of all other tagged items in the region which are adjacent to each tagged item by being within a specified constant distance (Rlimit) from each tagged item, said region being entirely within a communication range (Rrange) of the RFID reader.

The processor splits the region into a plurality of non-overlapping subregions such that the region consists of the non-overlapping subregions collectively.

The processor determines which tagged item in each subregion is a centered tagged item. Determining which tagged item in each subregion is the centered tagged item comprises utilizing the generated information to determine that the centered tagged item in each subregion has more adjacent tagged items in the subregion containing the centered tagged item than does each other tagged item in the subregion containing the centered tagged item. Utilizing the generated information to determine each centered tagged item comprises utilizing the spatial location of each tagged item in the subregion containing the centered tagged item and the list of all other tagged items in the subregion containing the centered tagged item which are adjacent to each tagged item in the subregion containing the centered tagged item by being within the specified constant distance (Rlimit) from each tagged item in the subregion containing the centered tagged item.

The processor selects the centered tagged item in each subregion as a central tagged item for each subregion.

The processor outlines a virtual boundary around the central tagged item to enclose the central tagged item and a portion of the tagged items in each subregion which are adjacent to the central tagged item by being within the specified constant distance (Rlimit) of the central tagged item. The virtual boundary defines a subset of the set of tagged items for each subregion as comprising the central tagged item and all other tagged items within the virtual boundary, wherein the portion of the tagged items in each subregion consists of all, or less than all, tagged items which are adjacent to the central tagged item in each subregion.

The present invention provides a computer program product comprising a computer readable tangible storage device having a computer readable program code embodied in the device. The program code is configured to be executed on a processor of a computer system to perform a method for dividing a set of tagged items into subsets, each tagged item being tagged with a passive Radio Frequency Identification (RFID) tag.

The processor instructs a RFID reader to poll the RFID tags of all tagged items in a specified region having fixed boundaries to generate information comprising, for each tagged item in the region, a spatial location of each tagged item and a list of all other tagged items in the region which are adjacent to each tagged item by being within a specified constant distance (Rlimit) from each tagged item, said region being entirely within a communication range (Rrange) of the RFID reader.

The processor splits the region into a plurality of non-overlapping subregions such that the region consists of the non-overlapping subregions collectively.

The processor determines which tagged item in each subregion is a centered tagged item. Determining which tagged item in each subregion is the centered tagged item comprises utilizing the generated information to determine that the centered tagged item in each subregion has more adjacent tagged items in the subregion containing the centered tagged item than does each other tagged item in the subregion containing the centered tagged item. Utilizing the generated information to determine each centered tagged item comprises utilizing the spatial location of each tagged item in the subregion containing the centered tagged item and the list of all other tagged items in the subregion containing the centered tagged item which are adjacent to each tagged item in the subregion containing the centered tagged item by being within the specified constant distance (Rlimit) from each tagged item in the subregion containing the centered tagged item.

The processor selects the centered tagged item in each subregion as a central tagged item for each subregion.

The processor outlines a virtual boundary around the central tagged item to enclose the central tagged item and a portion of the tagged items in each subregion which are adjacent to the central tagged item by being within the specified constant distance (Rlimit) of the central tagged item. The virtual boundary defines a subset of the set of tagged items for each subregion as comprising the central tagged item and all other tagged items within the virtual boundary, wherein the portion of the tagged items in each subregion consists of all, or less than all, tagged items which are adjacent to the central tagged item in each subregion.

The present invention provides a system for dividing a set of tagged items into subsets, each tagged item being tagged with a passive Radio Frequency Identification (RFID) tag. The system comprises:

means for instructing a RFID reader to poll the RFID tags of all tagged items in a specified region having fixed boundaries to generate information comprising, for each tagged item in the region, a spatial location of each tagged item and a list of all other tagged items in the region which are adjacent to each tagged item by being within a specified constant distance (Rlimit) from each tagged item, said region being entirely within a communication range (Rrange) of the RFID reader;

means for splitting the region into a plurality of non-overlapping subregions such that the region consists of the non-overlapping subregions collectively;

means for determining which tagged item in each subregion is a centered tagged item, said determining which tagged item in each subregion is the centered tagged item comprising utilizing the generated information to determine that the centered tagged item in each subregion has more adjacent tagged items in the subregion containing the centered tagged item than does each other tagged item in the subregion containing the centered tagged item, wherein said utilizing the generated information to determine each centered tagged item comprises utilizing the spatial location of each tagged item in the subregion containing the centered tagged item and the list of all other tagged items in the subregion containing the centered tagged item which are adjacent to each tagged item in the subregion containing the centered tagged item by being within the specified constant distance (Rlimit) from each tagged item in the subregion containing the centered tagged item;

means for selecting the centered tagged item in each subregion as a central tagged item for each subregion; and means for outlining a virtual boundary around the central tagged item to enclose the central tagged item and a portion of the tagged items in each subregion which are adjacent to the central tagged item by being within the specified constant distance (Rlimit) of the central tagged item, said virtual boundary defining a subset of the set of tagged items for each subregion as comprising the central tagged item and all other tagged items within the virtual boundary, wherein the portion of the tagged items in each subregion consists of all, or less than all, tagged items which are adjacent to the central tagged item in each subregion.

BRIEF DESCRIPTION OF THE DRAWINGS

The above and other items, features and advantages of the invention will be better understood by reading the following more particular description of the invention in conjunction with the accompanying drawings.

DETAILED DESCRIPTION OF THE INVENTION

Figure 1:
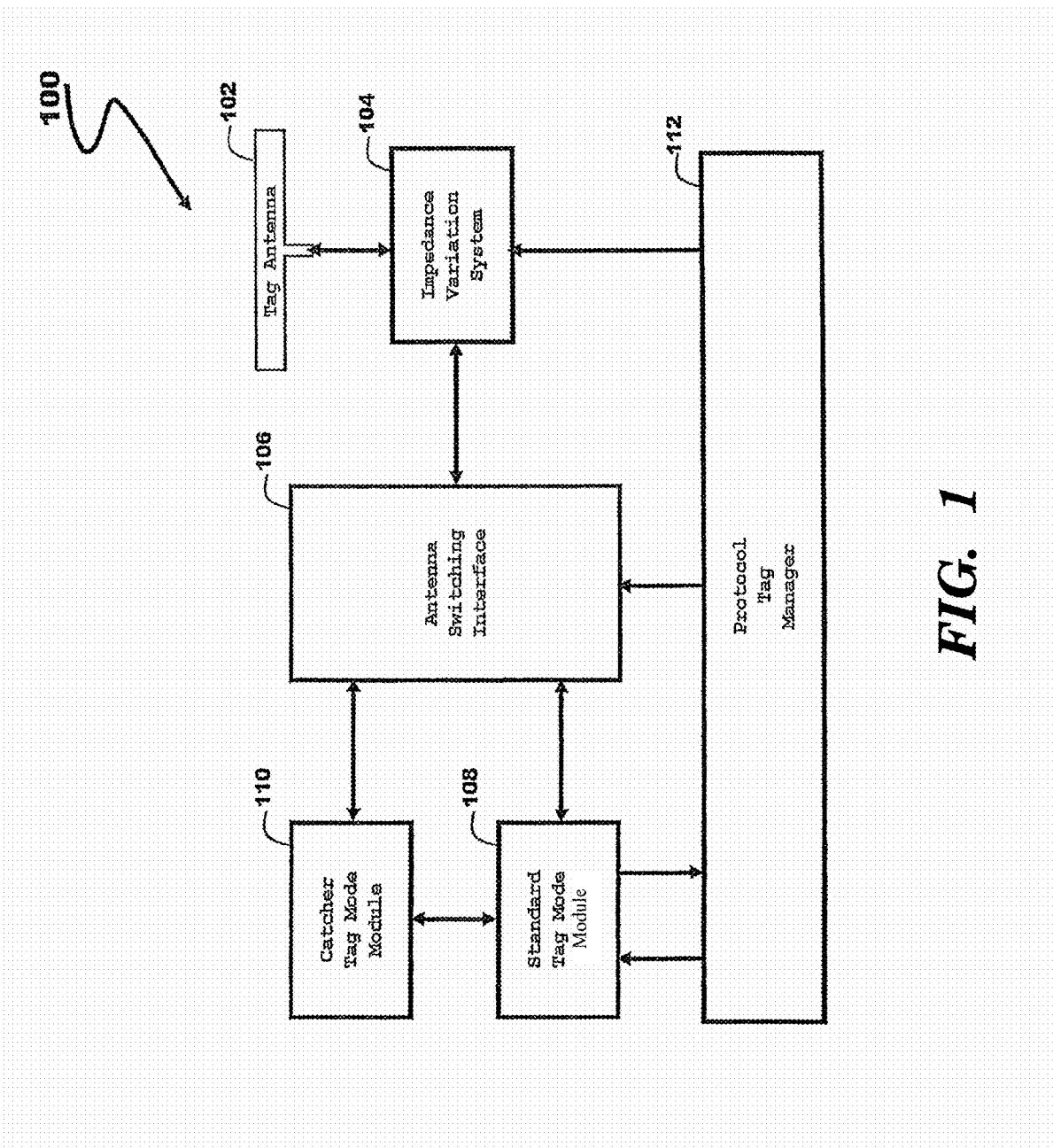
FIG. 1 shows a block diagram representing a general arrangement of a passive tag device, in accordance with embodiments of the present invention.

Embodiments of the invention are described herein after by way of examples with reference to the accompanying figures and drawings.

The detailed description of the invention is divided into sections as follows:
A. Locating RFID Tags; and
B. Dividing Tagged Items Into Subsets.
A. Locating RFID Tags The present invention provides an enhanced RFID wireless identification device using a passive tag, with peripheral circuits which allow the passive tag to be used either as a standard tag or as a catcher tag which overcome issues of the prior art described supra.

The present invention provides such a RFID device, wherein the identification of adjacent tags is possible.

The present invention to provide a Radio Frequency Identification (RFID) device for reading the content of a message hosted in an adjacent RFID tag and thereby determining the distance between a tag and the adjacent tag.

The present invention gathers identification of a group of adjacent tags in a predefined radius and generates a compacted identification message accordingly.

The present invention filters undesirable identification of, at least, one or more tags located in the delimited vicinity that are outside of a predefined radius.

The present invention to localizes uniquely a tag located in various adjacent delimited vicinities.

The present invention determines the quantity of adjacent tags present in the delimited vicinity and generates a list of tags accordingly.

The present invention provides a readable machine, namely a RFID reader, with a selective identification of a group of adjacent tags located in different delimited vicinities as well as in a predefined radius.

The present invention boosts the performance of a readable machine by regrouping the identification of the adjacent tags located in a predefined radius.

The present invention provides a computer program product. The computer program product comprises a computer usable storage medium having a computer readable program code and algorithm embodied in the medium and the computer program product includes at least one component or more to perform the steps of the timing and distance computation and any other calculation described herein, via execution of the program code on a processor of a computer system.

According to the invention, a passive RFID device comprises peripheral circuits allowing it to be used either as a standard passive tag or as a catcher tag. The peripheral circuits comprise means to swap the tag in the desired functionality.

In one embodiment, a RFID device is provided as comprising: receiving means for receiving an identification request from a RFID reader; and sending means responsive to the identification request for sending to the RFID reader an identification message.

The RFID device is characterized in that it further comprises: catching means for receiving a neighbor identification message from at least one adjacent RFID device responding to an identification request from the RFID Reader.

The catching means may comprise an antenna and a circuitry in communication with the antenna having means for processing the received neighbor identification message.

The present invention consists in provides a programmable passive tag that can be used either as a standard tag or as a catcher tag for picking up signals from adjacent tags located in a delimited vicinity and more specifically in a limited radius.

Physical and Technical Considerations:

A RFID passive tag comprises a microchip attached to an antenna that requires indispensable energy from an external readable machine (i.e., a RFID reader) to operate. The tag antenna is designed to resonate with a specific carrier wave that is provided by the readable machine. Typically, the readable machine sends some bursts of electromagnetic waves to the RFID passive tag that drive the antenna and thereby power correctly the internal circuitry. The RFID device replies to the incoming signals by providing the necessary information about its own identity.

At Ultra-High Frequency (UHF) bands, a passive tag may communicate with a readable machine by the use of a backscattering technique. The backscattering technique operates at UHF (>100 MHz) and higher frequency bands. The backscattering technique comprises modulating with a data signal a portion of the energy transmitted by the readable machine that is reflected by the antenna when resonating.

As shown in FIG. 1, a symbolic view in accordance with embodiments of the present invention represents a general arrangement of a passive tag device (100) comprising a Tag Antenna (102) coupled to an Impedance Variation System (104), an Antenna Switching Interface (106), a Standard Tag Mode Module (108), a Catcher Tag Mode Module (110) and a Protocol Tag Manager (112).

In use, the Tag Antenna (102) communicates with the readable machine (not shown) by backscattering the transmitted carrier wave and providing a receiver (not shown) located within the Antenna Switching Interface (106) with burst of electromagnetic waves of the readable machine for processing. Furthermore, the base of the Tag Antenna (102) is connected to the Impedance Variation System (104). The Impedance Variation System (104) controls dynamically the K-factor of the Tag Antenna (102) via the instructions it receives from the Protocol Tag Manager (112).

The aforementioned K-factor of the Tag Antenna (102) is a function of the impedance load variation at the antenna base that determines a theoretical backscattered power equivalent to P-backscattered that is demonstrated by the formula 1 (Form. 1):

$$P\text{-backscattered} = K\text{-factor} * Pa * G. \quad \text{(Form. 1)}$$

wherein Pa is the power collected by the tag antenna, G is the gain of the tag antenna, and K-factor is a function of the impedance load variation.

The arrangement of the Antenna Switching Interface (106) with the Standard Tag Mode Module (108) and the Catcher Tag Mode Module (110) insures that the functionality of the passive tag suits a standard mode as well as a catcher mode. To allow the catcher mode, the user configures the required functionality mode at the initialization phase via the Protocol Tag Manager (112).

In standard mode, the Protocol Tag Manager (112) sets the Impedance Variation System (104) in high impedance and activates the Antenna Switching Interface (106) in the appropriate position. Then, the Standard Tag Mode Module (108) receives the flux of electromagnetic waves from the readable machine through the Tag Antenna (102). The Standard Tag Mode Module (108) functionality is similar to any well-known passive tag. Once correctly queried, it provides the readable machine with its own identity as well as other information like the Electronic Product Code (EPC) that is hosted internally according to the standard RFID communication protocol. No further details about the Standard Tag Mode Module (108) functionality will be provided in this section.

The catcher mode differs from the standard mode by the ability to handle data carried by an adjacent tag when answering to a readable machine. To achieve such, a Catcher Tag Mode Module (110) is coupled to the Standard Tag Mode Module (108).

In catcher mode, the Protocol Tag Manager (112) initiates the Impedance Variation System (104) for varying the impedance load at the base of the Tag Antenna (102) and sets the Antenna Switching Interface (106) in the appropriate position that differs from the standard mode.

The Impedance Variation System (104) determines the adequate impedance of the load at base of the Tag Antenna (102) that is necessary for producing an antenna K-factor equal to "0" or "1". The Impedance Variation System (104) drives the Tag Antenna (102) with an internal three state driver circuit (not shown) that automatically adapts the proper impedance termination at the antenna base between whether a high impedance or a low impedance termination is to be set. It is noted that a three state driver produces a low impedance termination when driving a load. When the internal three state driver circuit drives the base of the Tag Antenna (102) by presenting a high impedance termination then the antenna K-factor is equal to "0". Alternatively, when a low impedance termination is presented, then the antenna K-factor is equal to "1" and the impedance of the Impedance Variation System (104) output is equal to the impedance of the antenna.

Then, both the Catcher Tag Mode Module (110) and the Standard Tag Mode Module (108) receive simultaneously the flux of electromagnetic waves from the readable machine via the Tag Antenna (102) for interpretation. The Standard Tag Mode Module (108) checks the query message it receives, detects the matching address as well as the missing ones, and initiates both the Catcher Tag Mode Module (110) and the Protocol Tag Manager (112) for operating.

The Catcher Tag Mode Module (110) interprets the addresses it receives and thereby identifies the correct operating mode for monitoring the reflected carrier wave accordingly. Depending on the operating mode, the Catcher Tag Mode Module either catches data (catching mode) from the adjacent tags answering to the readable machine or carries data (carrying mode) over when queried by the readable machine. Simultaneously, the Protocol Tag Manager (112) receives the matching address that operates the Impedance Variation System (104). Then the Impedance Variation System (104) modulates the reflected carrier waves with data representing, at least, the passive tag identity or requested data. When a missing address appears, the Protocol Tag Manager (112) disables the Impedance Variation System (104). Thereby, the Impedance Variation System (104) loads the Tag Antenna (102) with high impedance.

The Impedance Variation System (104) determines the adequate impedance of the load at the base of the Tag Antenna (102) that is necessary for switching the incident carrier wave from a fully absorbed wave to a fully reflected one and vice versa. Such a variation generates a modulation that can carry information by the use of the backscattering technique. By mixing a modulation of the reflecting carrier waves with the backscattering technique, a passive tag that responds to a query of a readable machine is capable to transmit its own identity message to at least one or more adjacent tags. Then, the modulation of the reflecting carrier waves is transmitted to the readable machine for interpreting the tag response.

It is noted that the aforementioned passive tags are located in a delimited vicinity and a limited radius which is preset at the tag configuration step via the Protocol Tag Manager (112).

However, the Protocol Tag Manager (112) requires some adjustments for satisfying the present invention. Indeed, some additional parameters are included in the existing RFID messages allowing both the readable machine and the tags to get the necessary parameters for determining tags positioned in a delimited vicinity.

Some of the parameters are listed herein as follows.

The acknowledge signal (ACK) issued from the readable machine when interrogating comprises three fields for loading parameters.

The first field contains a computed random number allowing a tag to be identified unambiguously by the random number when a readable machine initiates a query (RN16).

The second field contains the distance (D) value between the polled tag and the readable machine.

Finally, the third field provides a radius (Rlimit) value of a circle for which the polled tag represents the axis and further defines the area in which a tag can be considered as adjacent to the polled tag.

In addition, the tag response message contains data that provides the readable machine with computed information like PC, EPC, D (the distance between the polled tag and the readable machine) and an EPC_LIST representing the list of the adjacent tags.

Figure 2:
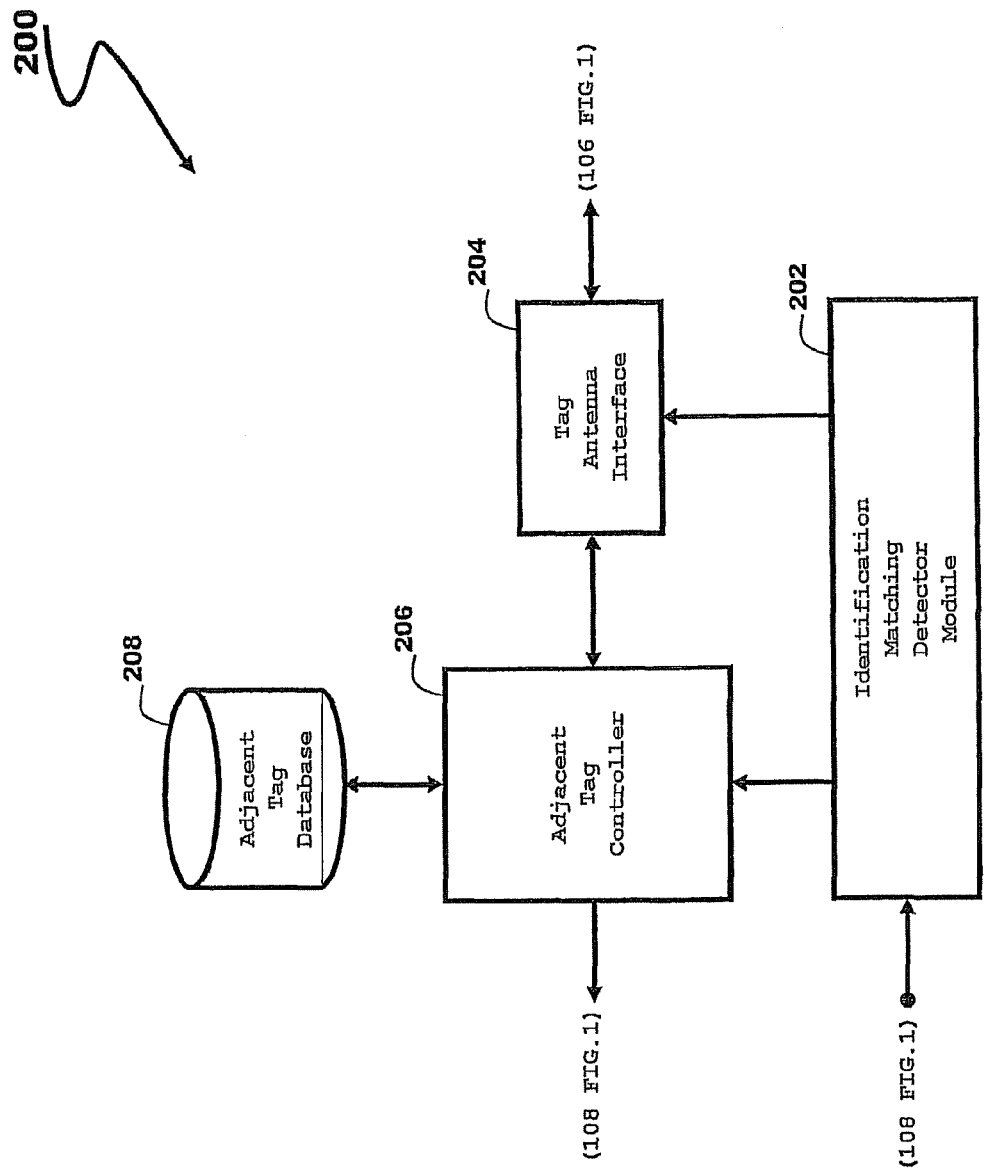
FIG. 2 depicts the Catcher Tag Mode Module, in accordance with embodiments of the present invention.

FIG. 2 illustrates in a high level, the Catcher Tag Mode Module (200) as may be applicable to the general arrangement of the passive tag device (100) of FIG. 1, in accordance with embodiments of the present invention.

When the tag is set in a catcher mode, the Catcher Tag Mode Module (200) operates in two ways.

Firstly, the readable machine queries the passive tag by using a standard protocol. The passive tag identifies the address it receives and, if a matching comparison occurs, turns the Catcher Tag Mode Module (200) in carrying mode. Thereby, the Catcher Tag Mode Module (200) takes advantage of the reflected carrier wave of a readable machine for carrying data, like tag identification and qualifiers and other relevant data that are stored in a local memory, over the antenna by the use of the backscattering technique.

Secondly, if there is no matching occurrence with the query of the readable machine, then the Catcher Tag Mode Module (200) is enabled in the catching mode to catch the data carried from the readable machine as well as those coming from the adjacent tags answering to the readable machine in the delimited vicinity. A local micro controller (not shown) identifies the adjacent tags located around and initiates a distance computation in between by running a microcode algorithm.

The Catcher Tag Mode Module (200) comprises an Identification Matching Detector Module (202), a Tag Antenna Interface (204) and an Adjacent Tag Controller (206) with an associated Adjacent Tag Database (208).

The Identification Matching Detector Module (202) decodes the addresses it receives from the Standard Tag Mode Module, identifies the correct operating mode (i.e., carrying mode or catching mode) and adapts the Catcher Tag Mode Module (200) functionality by setting the Tag Antenna Interface (204) accordingly.

If the decoded address does not match the query of the readable machine then the Identification Matching Detector Module (202) turns both the Adjacent Tag Controller (206) and the Tag Antenna Interface (204) in "catching mode". Then, the Tag Antenna Interface (204) catches the data reflected from the adjacent tags answering to the readable machine and, after demodulating, provides the Adjacent Tag Controller (206) with a stream of data and qualifiers that are carried by the flux of electromagnetic waves.

In the other case, where the addresses of the passive tag match with the query of the readable machine, the Identification Matching Detector Module (202) turns both the Adjacent Tag Controller (206) and the Tag Antenna Interface (204) in "carrying mode". Then, the Tag Antenna Interface (204) carries data with accompanying qualifiers from the Adjacent Tag Controller (206) over the Tag Antenna.

The Tag Antenna Interface (204) contains circuitry for managing the reflected carrier waves and further comprises circuitry for reducing the path between the Antenna Switching Interface (106) and the Adjacent Tag Controller (206) that optimizes the performance of the backscatter technique.

Figure 5:
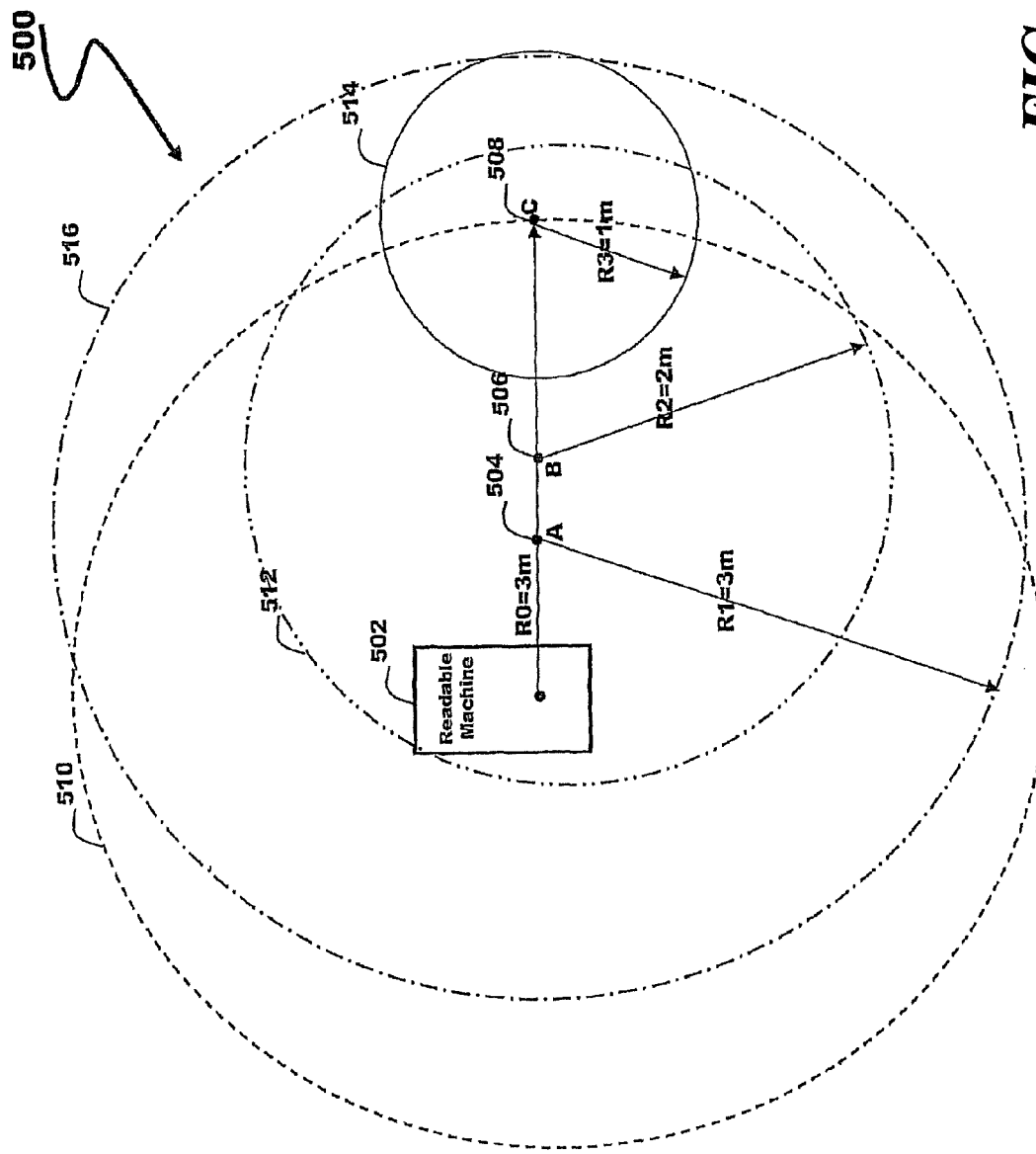
FIG. 5 illustrates an example of a suitable power budget allowing the Catcher Tag Mode Module to catch reflected data from an adjacent tag by satisfying the backscattering technique, in accordance with embodiments of the present invention.

The performance of the backscatter technique depends essentially on the backscattering yield that is a function of the relationship between the gain of a tag antenna and the path length from the receiver to the antenna as well as the definition of the suitable power budget for satisfying the receiver sensitivity as demonstrated in FIG. 5.

The Adjacent Tag Controller (206) is micro controller-based and interacts with a storage device, like a flash memory or equivalent (not shown), located in the Adjacent Tag Database (208).

In catching mode, the Tag Antenna Interface (204) transmits, after executing a demodulation, both the data and the associated qualifiers to the readable machine. Simultaneously, the Adjacent Tag Controller (206) picks them (i.e., the data and the associated qualifiers) for feeding the micro controller. Then the micro controller (not shown) initiates a computation processing by interpreting the content of the information carried by the flux of electromagnetic waves. Such content contains information like the adjacent tag identification or tag-to-tag distance or tag-to-readable machine distance as well as a list identifying a group of adjacent tags located in the same vicinity or any other required information for deriving tag geographical information. Then, the Adjacent Tag Controller (206) extracts the elements that identify the tag, interprets tag distance qualifiers, initiates the distance algorithm, determines the tags matching with the predefined user's criteria, references them and stores all parameters and results into the storage device of the Adjacent Tag Database (208). It is noted that the distance computation is aggregated over the qualifiers that identify the adjacent tags.

In carrying mode, the Adjacent Tag Controller (206) selects from the Adjacent Tag Database (208) the distance information of the adjacent tags previously stored during the catching mode. Furthermore, it provides the readable machine with information related to its identification (EPC). Then the Adjacent Tag Controller (206) transmits the data with accompanying qualifiers from the Tag Antenna Interface (204) over the Tag Antenna (FIG. 1: 102).

Figure 3:
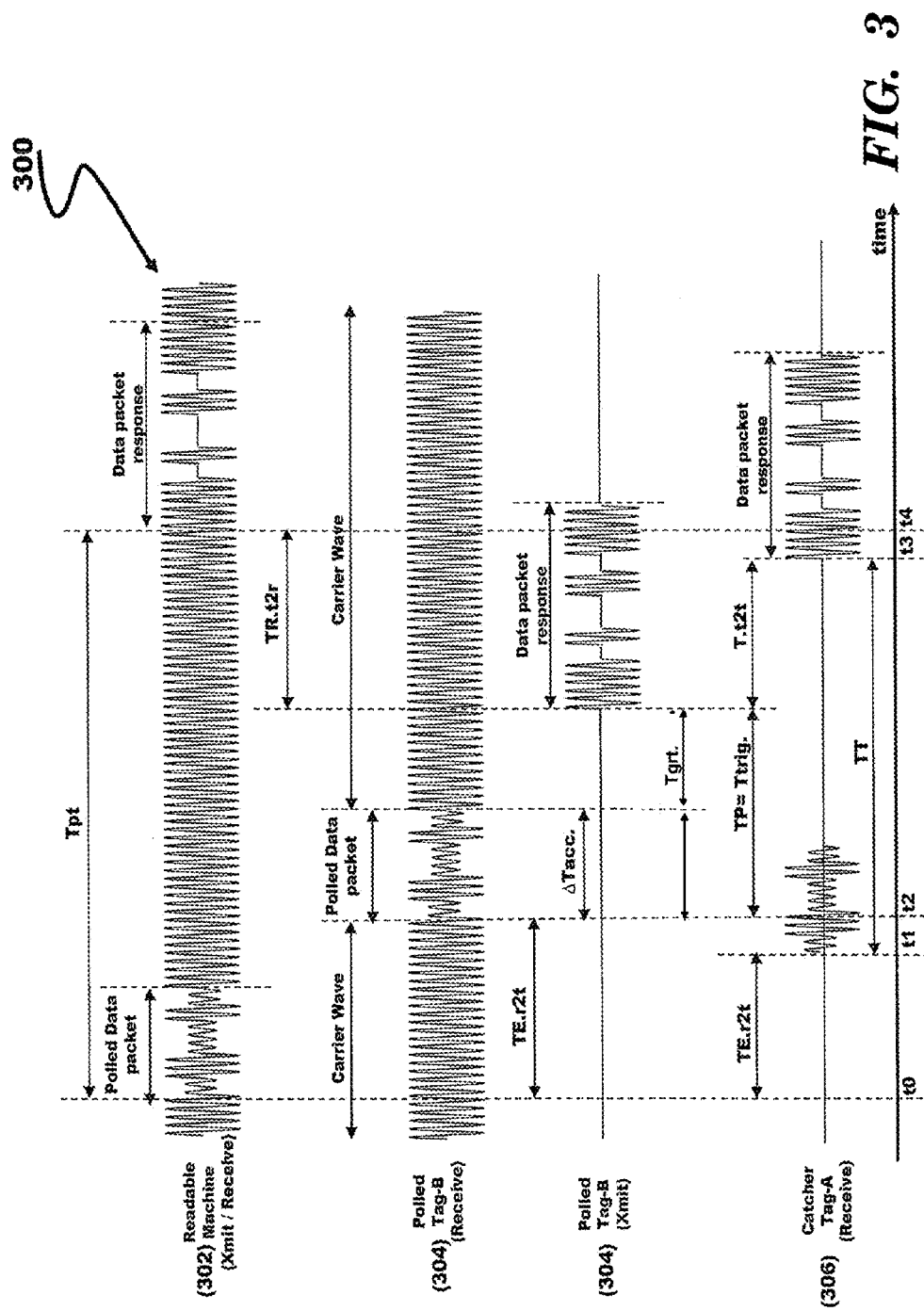
FIG. 3 shows an analysis of the total process timing from an emitted signal by the readable machine until a backscattered catching data packet of a tag answers to the readable machine, in accordance with embodiments of the present invention.

Going now to FIG. 3, wherein an analysis of the total process timing from an emitted signal by the readable machine until a backscattered catching data packet of a tag answers to the readable machine is described in detail, in accordance with embodiments of the present invention.

In operation, a readable machine (302) broadcasts a reader command within a round frame that initiates a sequence of asynchronous exchanging messages between the readable machine and a series of tags (i.e. 304 and 306) located in the frame size. The round frame size depends on the emitted power of the readable machine and is represented by a radius (Rrange) that delimitates the communication range between the readable machine and the tags.

The readable machine produces a query to a remote tag. The remote tag collects the information of the query and, after processing its identification, transmits data packets to the readable machine. The data packets transmitted to the readable machine contain information related to the separating distance from the tag to the readable machine (D.t2r). The total process timing (Tpt) duration that is required to achieve such an operation varies in proportion to the position of the tags in the frame and the length of the data packets that need to be treated.

The total process timing (Tpt) represents the time (at time t4) it takes for a readable machine to receive a data packets from a polled tag after the readable machine starts to poll a tag by initiating a reader command at time t0. Thus, Tpt is equal to t4 minus t0.

Then, for satisfying both the process tracking and distance computing, some parameters are stored into a register in both the reader and the polling tag for future usage. Such parameters comprise the start time, the end time and the duration of the total process timing (Tpt) as well as the allotted radius limit (Rlimit) in which tags are considered as adjacent.

It is to be noted that the aforementioned allotted radius limit (Rlimit) is part of the acknowledge signal (ACK) and can be defined either on user configuration or in real time by the use of the readable machine at an initialization step.

Generally, the operations that generate a variation of the process timing comprise the following events as listed herein:

the emitting transmission time (TE.r2t) that is a function of the distance (D.t2r) there exists between a remote tag and the readable machine and;

the granted time of the tag for responding (Tgrt) which is related to the process to do on the data and;

the access time of the tag (ΔTacc) that a tag needs for reading a received data packet that is in proportion of the data packet length and;

the responding transmission time (TR.t2r) for transmitting data from the tag to the readable machine that is normally identical to the emitting transmission time (TE.r2t).

To illustrate the duration of a total process timing (Tpt) consider the formula 2 (Form. 2) as demonstrated herein.

$$Tpt=2TX+Tgrt+\Delta Tacc \quad \text{(Form. 2)}$$

with:

$$TX=TE.r2t=TR.t2r=D.t2r/C.$$

wherein: D.t2r is the distance (m) between the readable machine and the tag, C is the light speed equal to 300000 km/s, TE.r2t and TR.t2r are the transmission times between the readable machine and the tag, Tgrt is the granted time for a tag for processing the received data packet, and ΔTacc is the access time of the tag for reading the received data packet.

Thus, as demonstrated in Form. 2, the total process timing (Tpt) of a polling process depends essentially on both the transmission times (TE.r2t and TR.t2r), the unavoidable access time (ΔTacc) and the time for tag processing (Tgrt), of the responding tag. It is to be noted that the access time (ΔTacc) of a responding tag and the time (Tgrt) for tag processing of the responding tag varies due to different data packet lengths and consequently randomizes the timing variation of the total process timing (Tpt) that may be a concern when using the present invention.

Both transmission times (TE.r2t and TR.t2r) are derived by executing a round scanning of the tag population when starting a reader command. Then, each tag radius (R.t2r) as well as other parameters related to the position of the tag are determined in regards to the readable machine and are sent to each polling tag for hosting. In addition, when responding to the readable machine, a polled tag includes in the transmitted data packet said radius sent by the readable machine which allows any non-polled tags to obtain the separating distance (D.t2r) for hosting.

In order to bypass the undesirable timing variations of the access time (ΔTacc) and the time for tag processing (Tgrt), each polled tag (i.e. Tag-B: 304), that is consequently set in carrying mode, enables a particular delay circuitry that triggers, at a presetting time value (Ttrig), the responding data packet independently of the data packet length and data process. The presetting time value (Ttrig) is not less than a sum of a maximum value of ΔTacc and a maximum value of Tgrt. The presetting time value (Ttrig) can be loaded either on user configuration or in real time by the use of the readable machine at initialization step.

Additionally, each non-polling tag (i.e. Tag-A: 306) switches to catching mode. Then, each non-polling tag uses the backscattering technique for generating a total timing envelope (TT) that represents the timing length of the ongoing transaction. The total timing envelope (TT) starts, at time t1, when each non-polling tag receives a polling command addressed to a polled tag. The occurrence of the received data packet from the tag answering to the readable machine, at time t3, determines the endpoint of the envelope in time.

Each tag contains its own transmission time parameters (TE.r2t and TR.t2r) previously stored at initialization time and furthermore each tag catches the transmission time parameters (TE.r2t and TR.t2r) belonging to the tag answering to the readable machine by the use of the backscattering technique. By integrating the total timing envelope (TT) with the aforementioned transmission time parameters, each non-polled tag (i.e. Tag-A: 306) infers the separating transmission time (T.t2t) with the polled tag responding and consequently the distance (D.t2t) between the non-polled tag and the polled tag.

Finally, the separating transmission time (T.t2t) is compared with time limit derived from the allotted radius limit (Rlimit) to determine if the responding polled tag is adjacent to the non-polled tag. If it is the case, the responding tag Id is saved to be further transmitted to the readable machine.

For implementing such algorithm, all RFID tags are synchronized in time. This is achieved by using received signal carrier from the RFID reader as an internal time base.

The formula 3 (Form. 3) details the computation steps for determining the separating transmission time (T.t2t) of a series of tags located in the same vicinity of a catcher tag (Tag-A) and thereby defining that a tag is adjacent to another one as demonstrated herein:

$$TT=[TE.r2t.tagB-TE.r2t.tagA]+TP+T.t2t$$

$$T.t2t=TT-TP-[TE.r2t.tagB-TE.r2t.tagA] \quad \text{(Form. 3)}$$

It is to be noted that TE.r2t.tagA (catcher) has been previously set by the readable machine and TE.r2t.tagB is set in the response of Tag-B to the readable machine.

If $(T.t2t)*C \leq Rlimit$ then tagA and TagB are adjacent.

wherein: TE.r2t.tagA is the transmission time for Tag-A (306), TE.r2t.tagB is the transmission time for Tag-B (304), TT is the total timing envelope, and TP is equal to Ttrig. Ttrig represents a constant delay for getting rid of the variation of the tag access time (ΔTacc) when reading a received data packet and data granted processing time (Tgrt). Tgrt is the processing time for a tag for responding.

Figure 4:
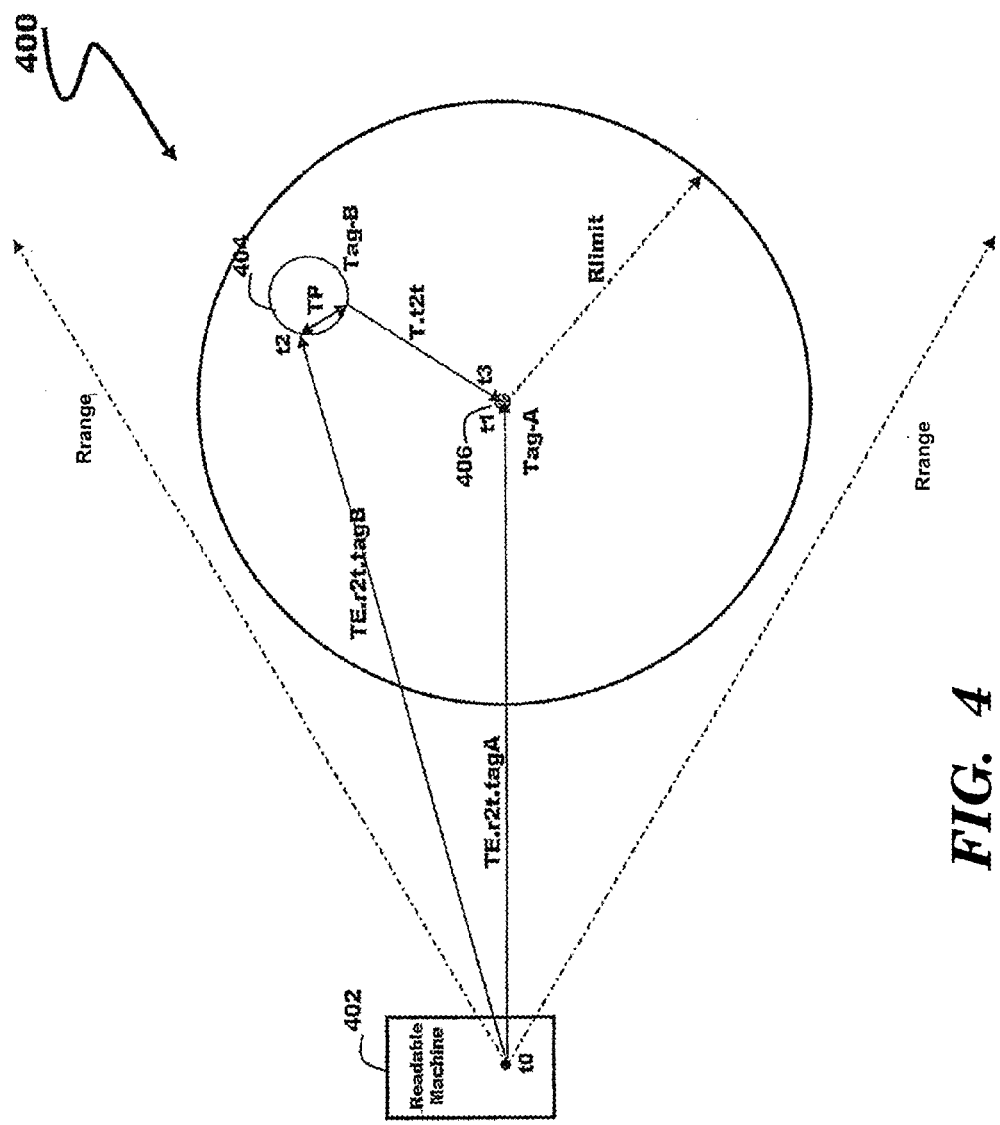
FIG. 4 shows a sequence of a separating distance computation for determining the proximity of tags located in the same vicinity, in accordance with embodiments of the present invention.

Going now to FIG. 4, a sequence of a separating distance computation for determining the proximity of Tag-A (406) to Tag-B (404) (i.e., the distance between Tag-A (406) and Tag-B (404)) and each other will now be described in reference to both the FIG. 3 and the Form. 3, in accordance with embodiments of the present invention.

At time t0, a readable machine (402) broadcasts within a delimited communication range (Rrange) a polled data to be transmitted to Tag-A (406) and Tag-B (404).

Both Tag-A (406) and Tag-B (404) are located at different distances from the readable machine (402) and need respectively TE.r2t.tagA and TE.r2t.tagB transmission time to be reached.

In the present example, the placement configuration assumes that Tag-A (406) is closer than Tag-B (404) to the readable machine (402) and consequently receives, at time t1, the polled data before Tag-B (404) receives the polled data at time t2.

At time t0, each tag contains information on the allotted radius limit (Rlimit) where tags are considered as adjacent by the readable machine (402).

Then, the readable machine (402) polls Tag-B (404).

Tag-B (404) replies to the readable machine by providing its identification (EPC) and the separating distance parameters (D.t2r) between Tag-B (404) and the readable machine (402). It is noted that the separating distance computation is derived from the transmission time (TE.r2t.tagB).

Additionally, Tag-A (406) switches in catching mode and is thus capable of receiving and interpreting the echo coming from Tag-B (404) by the use of the backscattering technique.

It is noted here that, by the use of the backscattering technique, Tag-A (406) is capable of catching the flux of electromagnetic waves existing between the readable machine (402) and the polling Tag-B (404).

Then, at time t1, Tag-A (406) initiates the timing time envelope (TT) while, at time t2, Tag-B (404) starts polling data packets and enables the delay circuitry allowing to trigger at a presetting time value (Ttrig) the responding data packet.

At the predefined time value (Ttrig) expiration, Tag-B (404) transmits requested data packets to the readable machine (402).

As already explained before, the aforementioned data packet contains the Tag-B (404) identification (EPC) and the information related to the separating distance (D.t2r) between the Tag-B (404) and the readable machine (402).

While Tag-B (404) transmits the requested data packet to the readable machine (402), Tag-A (406) receives transmission time (T.t2t) later, at time t3, the echo from Tag-B (404) and consequently ends the processing of timing envelope (TT) that started at time t1.

Then Tag-A (406) computes the separating transmission time (T.t2t) by applying the formula of Form. 3 and determines if Tag-A (406) is adjacent to Tag-B (404) or not.

Tag-A (406) contains the necessary parameters for computing the separating transmission time: TE.r2t.tagA transmission time; TE.r2t.tagB transmission time; TP (defined); TT (defined as the difference between t3 and t1); and the allotted radius limit (Rlimit) (defined). Thus the computation of the separating transmission time (T.t2t) is defined.

Then, the result of distance pertaining to the computed separating transmission time (T.t2t) is compared to the allotted radius limit (Rlimit). Finally, Tag-A (406) is adjacent to Tag-B (404) and vice-versa if the separating transmission time (T.t2t) determines a distance (T.t2t*C) that is equal or less than the allotted radius limit (Rlimit) by respecting the delimited communication range condition (Rrange) in which both Tag-A and Tag-B are located.

FIG. 5 illustrates in a high level a typical power budget allowing the Catcher Tag Mode Module (FIG. 1: 110) to catch reflected data from an adjacent tag by using the backscattering technique.

Some references to formulate the power budget arrangement are initially described as follows.

Gain of an antenna: The theoretical gain of an antenna coupled to a path length less than 1 cm is around 2 dBi (isotropic) that produces a comfortable backscattering yield (c.f. reference from an article published by the "Intelleflex Corporation"). An isotropic antenna broadcasts power equally in all directions. The real gain of the aforementioned isotropic antenna is equal to 0 dB as given by the converting formula: 0 dB=2.14 dBi.

dBm unit (decibel-milliWatt): In a RFID wireless network the symbol dBm refers to relative changes in magnitude. Some examples of Watt to dBm conversion are illustrated below:

1 W transmission power=30 dBm
1.3 mW=1 dBm
100 μW=−10 dBm
63 nW=−42 dBm

Minimum energy for powering a tag: The minimum energy (P_tagmin) for powering a passive RFID tag is around −10 dBm (100 W) that is above of the sensitivity of a standard tag receiver. Generally, the sensitivity of a standard tag receiver is −42 dBm (63 nW). By comparison, a semi-passive RFID tag contains an internal battery that provides the electronic circuitry with the necessary energy. Thereby, the power limitation of the semi-passive RFID tag is due only to the receiver sensitivity (−42 dBm).

Loss of modulation: Measurements in anechoic chamber commonly give a tag return loss of 32 dB for a measuring distance of 50 cm (c.f. K. V. Seshagiri Rao IEEE white paper 12/2005) as detailed in the formula 4 (Form. 4) herein:

$$\text{Loss(db)} = 10\,\text{Log}((4*Pi*D)/\text{Lamda})^2. \quad \text{(Form. 4)}$$

wherein: D is the distance (m) and Lamda is the wavelength of the frequency in use (i.e. 860 MHz for UHF and 300000 km/s for the light speed that gives Lamda=300/860).

Formula 4 (Form. 4) demonstrates that, an UHF transmission (860 MHz) in the air has:

31.15 dB of modulation lost at 1 meter of distance from a readable machine and;
37.15 dB of modulation lost at 2 meters of distance and;
40.60 dB of modulation lost at 3 meters of distance.

The backscattering loss (bkst_loss) with no modulation is less than 1 db (c.f. Intelleflex Corporation).

The maximum carrier wave attenuation (CWave_att), for providing the receiver with sufficient energy (P_tagmin), depends on both the emitted power (P_reader) and the transmission gain penalty (P_penalty). The transmission gain penalty (P_penalty) is proportional to the separating distance of the Catcher Tag Mode Modules (FIG. 1: 110) with the readable machine.

The receiver that is included in the Catcher Tag Mode Modules (FIG. 1: 110) needs −10 dBm of minimum power (P_tagmin) to be activated. Then, the maximum carrier wave attenuation (CWave_att) allowing the Catcher Tag Mode Modules (FIG. 1: 110) to receive enough energy to operate is given by the formula 5 (Form. 5):

$$CWave\_att \leq P\_tagmin \leq P\_reader - P\_penalty \quad \text{(Form. 5)}$$

$$P\_penalty \leq P\_reader - CWave\_att$$

wherein: CWave_att is the maximum carrier wave attenuation allowed, P_tagmin is the minimum energy for activating a tag (−10 dBm), P_reader is the power delivered by the readable machine (30 dBm), and P_penalty is the transmission gain penalty that is a function of the distance between the readable machine and the receiver.

Thus, it is shown that the maximum separating distance is proportional to the transmission gain penalty (P_penalty) that appears between the readable machine and the receiver.

By assuming that the forward power of the RFID readable machine is 1 W (30 dBm), the formula 5 (Form. 5) shows that the maximum transmission gain penalty is 40 db (P_penalty=30 dBm−−10 dBm=40 db equivalent to 10*Log (1000 mW/0.1 mW)) that gives a maximum separating distance of 3 meters as demonstrated in formula 4 (Form. 4).

Finally, in catching mode, a tag that is supplied within the same readable machine range as an adjacent polling tag can receive a backscattered response from the aforementioned tag by the limit of its receiver sensitivity. Consequently, a power budget for determining the maximum attenuation of the backscattered signal that is allowed for achieving a distant tag receiver sensitivity, in catching mode, when the communication with an adjacent tag, in carrying mode, is in limit of range is demonstrated by FIG. 5 with the accompanying of the formula 6 (Form. 6) herein:

$$CWave\_att \leq P\_tagmin \leq P\_reader - P\_penalty$$

$$Max\_att\_all \leq P\_tagmin.tag\_A - Cwave\_att - bkst\_loss.tag\_B \quad \text{(Form. 6)}$$

wherein:
tag_A=tag in catching mode;
tag_B=tag in carrying mode;
Max_att_all is maximum attenuation of the backscattered signal allowed in the path between tag_A and tag_B;
CWave_att is the maximum carrier wave attenuation allowed at the intermediate distance between the readable machine and the tag_A for providing the tag_B receiver with the sufficient powering;
P_tagmin.tag_A represents the tag_A receiver sensitivity; and
bkst_loss.tag_B is the tag_B backscattering loss with no modulation of 1 db (admitted rules).

As illustrated in the FIG. 5, the sensitivity of a communication between a tag that is in carrying mode (tag_B) and an adjacent tag that is in catching mode when located within the delimited vicinity is detailed.

A readable machine (502) broadcasts sequentially polled data within a delimited communication range (Rrange) to be received respectively by the tag_B when it is located at spot A (504), then at spot B (506) and finally at spot C (508).

The system operates in a volume equivalent to the intersection of the delimited communication range (Rrange) provided by the readable machine (502) with the catching range existing between a polling tag and a tag that is in catching mode. For example, when the tag_B is located at spot C (508), the resultant volume given by the intersection of the sphere (510) with the sphere (514) represents the operating volume of the system.

By applying the formula 6 (Form. 6) on a passive tag (tag_B) for which the minimum energy (P_tagmin) is −10 dBm, it is demonstrated that a semi-passive tag (tag_A) with a receiver sensitivity of −42 dBm can communicate together as shown herein:
P_reader=30 dB;
Rrange=3 meters;
P_tagmin.tag_A=−42 dBm;
P_tagmin.tag_B=−10 dBm; and
bkst_loss.tag_B=−1 dBm.
Tab_B located at spot A (504):
A maximum separating distance of 1 meter with the readable machine gives a gain penalty of 31 dBm that sets Cwave_att at a value equal −1 dBm.

$$Max\_att\_all \leq -42\ dBm - 1\ dBm - 1\ dBm = -40\ dBm.$$

According to the Formula 4 (Form. 4), 40.60 dB of modulation lost represents 3 meters of distance (R1) that is sufficient for communicating with a tag_A in catching mode (not shown here) located in the delimited vicinity (516).
Tab_B located at spot B (506).
A maximum separating distance of 1.5 meters with the readable machine gives a gain penalty of 34.6 dBm that sets Cwave_att at a value equal −4.6 dBm.

$$Max\_att\_all \leq -42\ dBm - 4.6\ dBm - 1\ dBm = -36.4\ dBm.$$

According to the Formula 4 (Form. 4), 37.15 dB of modulation lost represents 2 meters of distance (R2) that is sufficient for communicating with a tag_A, in catching mode (not shown), located in the delimited vicinity (512).

Tab_B located at spot C (508):
A maximum separating distance of 3 meters with the readable machine, represented by a round frame (510) of 3 meters radius (R0), gives a gain penalty of 40 dBm that sets Cwave_att at a value equal −10 dBm.

$$Max\_att\_all \leq -42\ dBm - 10\ dBm - 1\ dBm = -31\ dBm.$$

According to the Formula 4 (Form. 4), 31.15 dB of modulation lost represents 1 meter of distance (R3) that is sufficient for communicating with a tag_A, in catching mode (not shown) located in the delimited vicinity (514).

B. Dividing Tagged Items into Subsets

The present invention provides a system and method for identifying a series of tagged items that are located in a delimited vicinity.

The present invention discriminates a tagged item from a series of tagged items that are assembled together in a delimited vicinity by avoiding reading collision.

The present invention gathers identification of a group of adjacent tags in a predefined radius and generate a compacted identification message accordingly.

The present invention filters undesirable identification of, at least, one or more tags located in a delimited vicinity that are outside of a predefined radius.

The present invention localizes uniquely a tag located in various adjacent delimited vicinities.

The present invention determines the quantity of adjacent tags present in a delimited vicinity and generates a list of tags accordingly.

The present invention provides a Radio Frequency Identification (RFID) reader with a selective identification of a group of adjacent tags located in different delimited vicinities as well as in a predefined radius.

The present invention boosts the performance of a RFID Reader by regrouping the identification of adjacent tags located in a predefined radius.

The present invention provides a computer program product comprising a computer usable storage medium having a computer readable program code and algorithm embodied in the medium and the computer program product includes at least one component or more to operate the steps of the distance computation method and any other calculation described herein, via execution of the program code on a processor of a computer system.

The present invention comprises identifying simultaneously a series of tagged items assembled in a case or a pallet, and a method allowing a Pallet Management System (PMS) to capture unambiguously the content of the identified items by using RFID capabilities.

Figure 6:
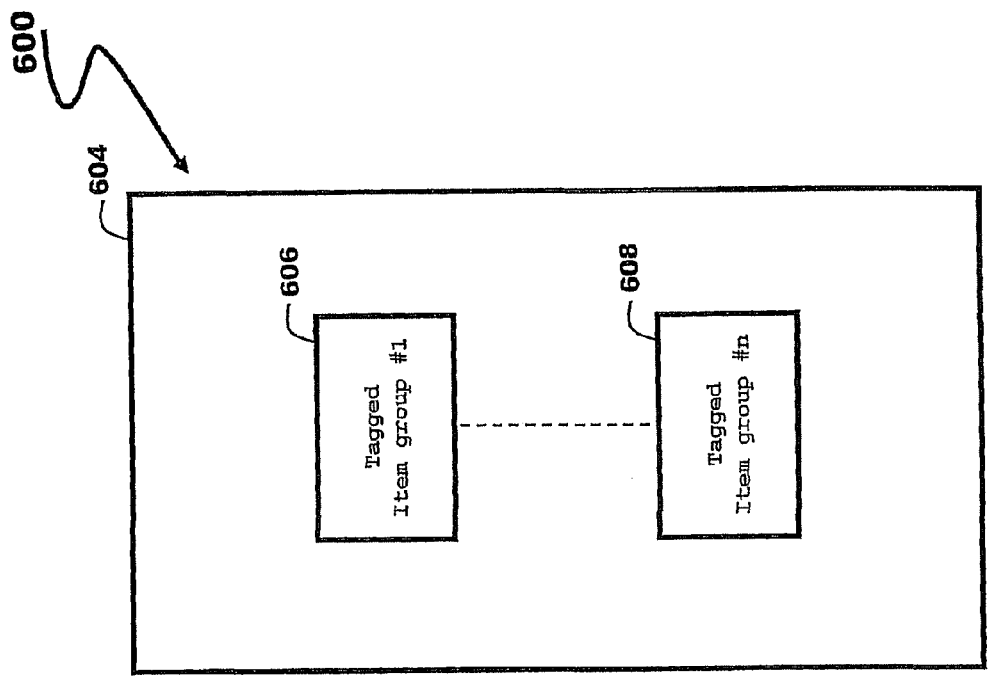
FIG. 6 shows a block diagram of an implementation for practicing the present invention.
Figure 6:
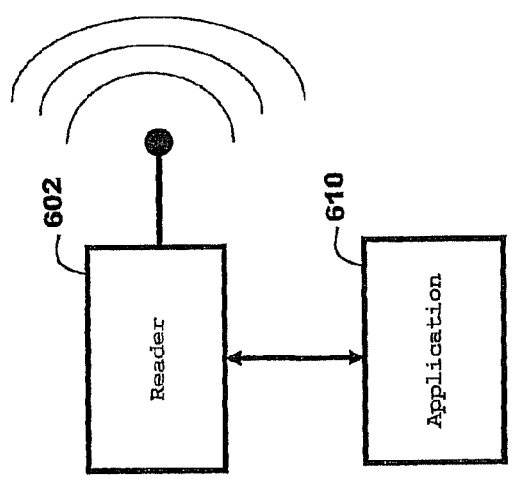

FIG. 6 illustrates by schematic block diagram an environment (600) for practicing the present invention. The environment (600) comprises a Reader (602), a Stocking Environment (604) like a yard comprising several Tagged Item Groups (#1 (606) to #n (608)) like pallet or case, and a Client Application (610) based on a RFID system.

The RFID system operates at the reader level. The Reader (602) is an RFID reader that communicates with or interrogates different groups of tagged items that are respectively arranged in Tagged Item Group #1 (606) up to Tagged Item Group #n (608). It is considered that Tagged Item Group #1 (606) and Tagged Item Group #n (608) do not have relationship together but are located within a same Stocking Environment (604). For the sake of simplicity, only two groups of tagged items are represented in FIG. 6 but the person who is skilled in the art can imagine that the RFID system may contain in a packaging supply chain more than the two illustrated groups. The Reader (602) initiates multiple reading shots for targeting the tagged items that correspond exclusively to the Tagged Item Group #1 (606) or the Tagged Item Group #n (608). Thereby, each Tagged Item Group (606, 608) contains a large amount of tagged items (not shown) that the Reader (602) has targeted as being located in the delimited vicinity. The delimited vicinity is configured in the algorithm that suits for the Client Application (610). The delimited vicinity is determined by the separating distance between a tagged item that belongs to a particular Tagged Item Group (606 or 608) and the Reader (602).

A non-responding passive tag is capable catching and store the information carried by a tag responding to a reader by the use of backscattering technique. A non-responding tag can then restore the loaded information about its separating distance between adjacent tags to the reader when queried.

Then, by the use of an appropriate algorithm, the Client Application (610) processes the data collected by the Reader (602) from the targeted tagged items to be transmitted to either a Pallet Management System (PMS) and/or to a packaging supply chain logistic and/or to other database used by other client systems.

Figure 7:
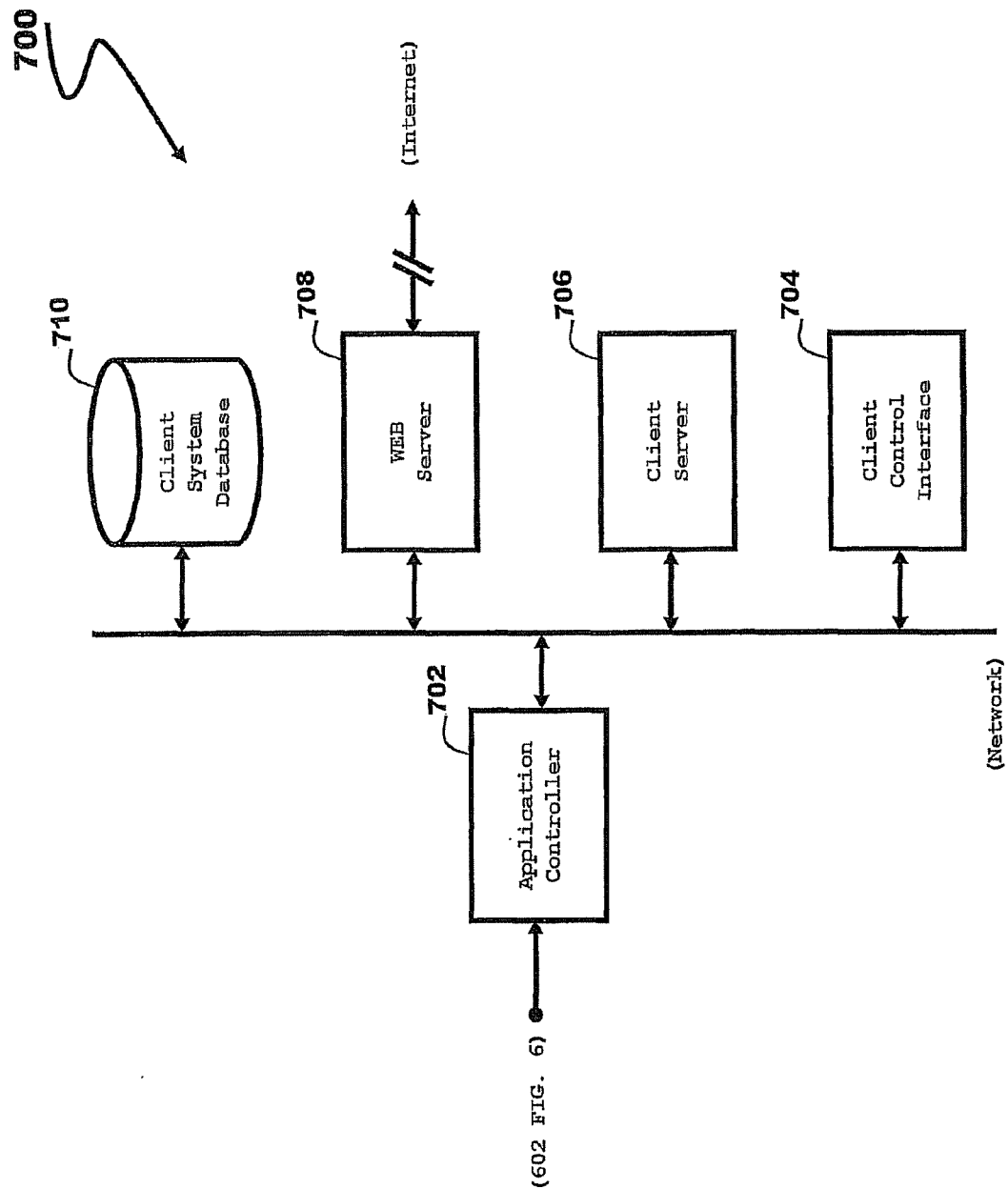
FIG. 7 illustrates in a high level, a Client Application as may be applicable to the embodiments of the present invention.

FIG. 7 illustrates in a high level, the Client Application (200) as may be applicable to the environment of the invention.

The Client Application (700) comprises an Application Controller (702), a Client Control Interface (704), a Client Server (706), a WEB server (708) and a Client System Database (710) that are linked together on a client network (Network).

The Client Application (700) uses a standard network to process data which are collected by the Reader (602 of FIG. 6) and exchanges information across the different layers of the packaging supply chain. It is to be noted that depending on the client application a data structure may contain multiple layers to form a client network solution. As an example, one can be used to control the signals streaming all along the supply chain while other ones can be used to handle the operation at the client layer. For the sake of simplicity, the present invention uses a single network (Network) for communicating between different layers.

The Application Controller (702) interacts with the Reader, interprets data gathering and transmits the information collected to the Client System Database (710) to be stored via the client network (Network). The Application Controller (702) automates the process flow from the reader level to the Client Server (706). Thereby, the Client Server (706) collects the information from the Application Controller (702) and sends the information to the client's communication system over the Internet via the WEB server (708). It is to be noted that the client network (Network) is the backbone of the supply chain and links all the devices of the supply chain (like server, database or personal computer) together. Finally, the Client Control Interface (704) monitors the data exchanges between each system all along the client supply chain.

Generally, the Application Controller (702) contains a software agent for preventing reading collisions and ensuring a proper and timely communication with the tagged items. In the present invention, the software agent runs a discrimination algorithm for determining the distance for all tagged items that are located in the same vicinity. The discrimination algorithm allows the Reader (602 of FIG. 6) to initiate multiple reading shots to the tagged items. Thereby, it can identify among a large amount of tagged items the aggregated ones that are assembled together in a predefined volume, whether in a box or in a package, in cases or/and pallets. Moreover, the proposed discrimination algorithm computes at the reader level the encapsulating volume of tagged items by excluding the undesirable response of other tagged items being outside the predefined volume.

Figure 8:
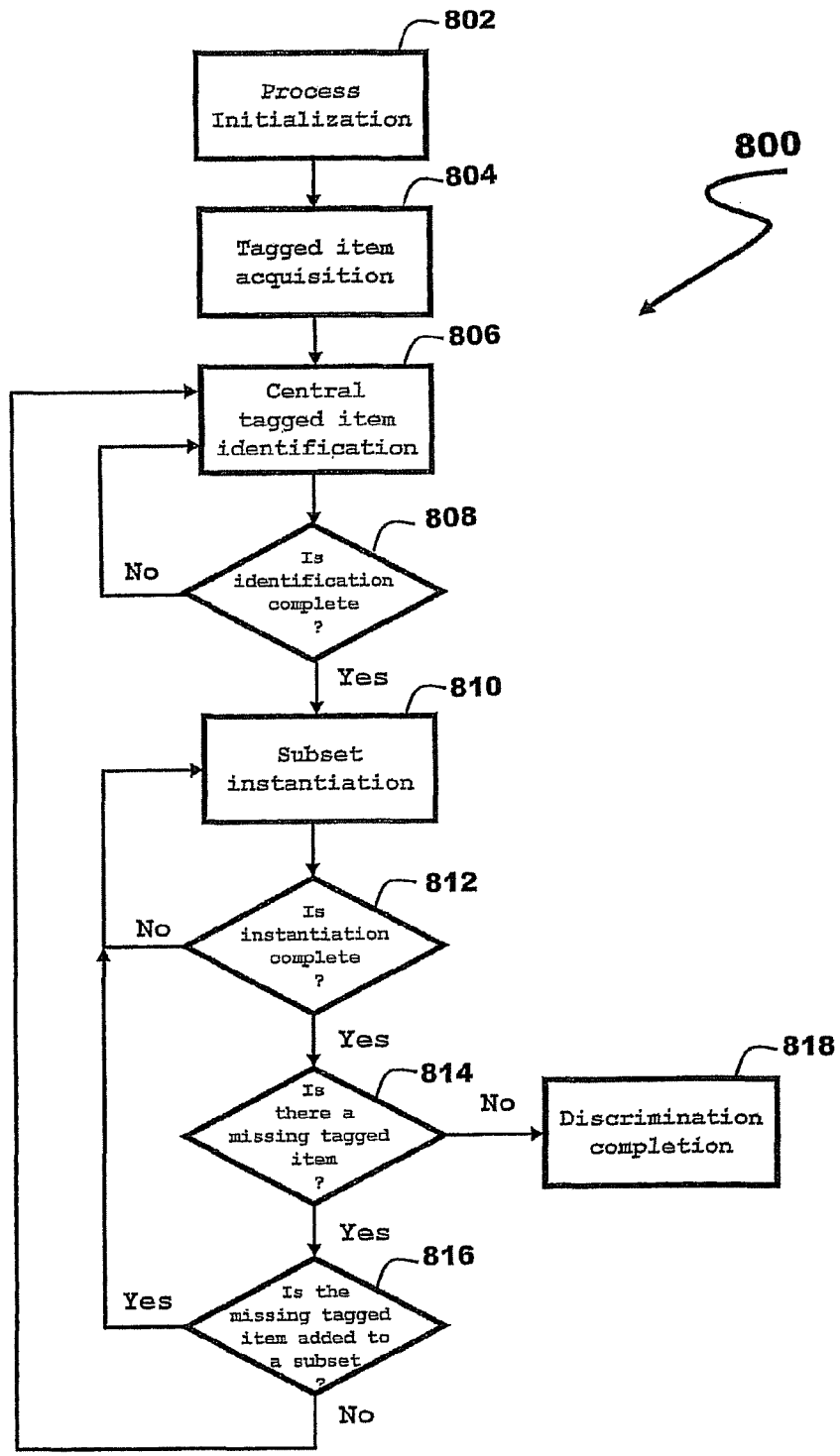
FIG. 8 represents a flow chart that outlines the discrimination algorithm of the Application Controller of FIG. 7, in accordance with embodiments of the present invention.
Figure 10:
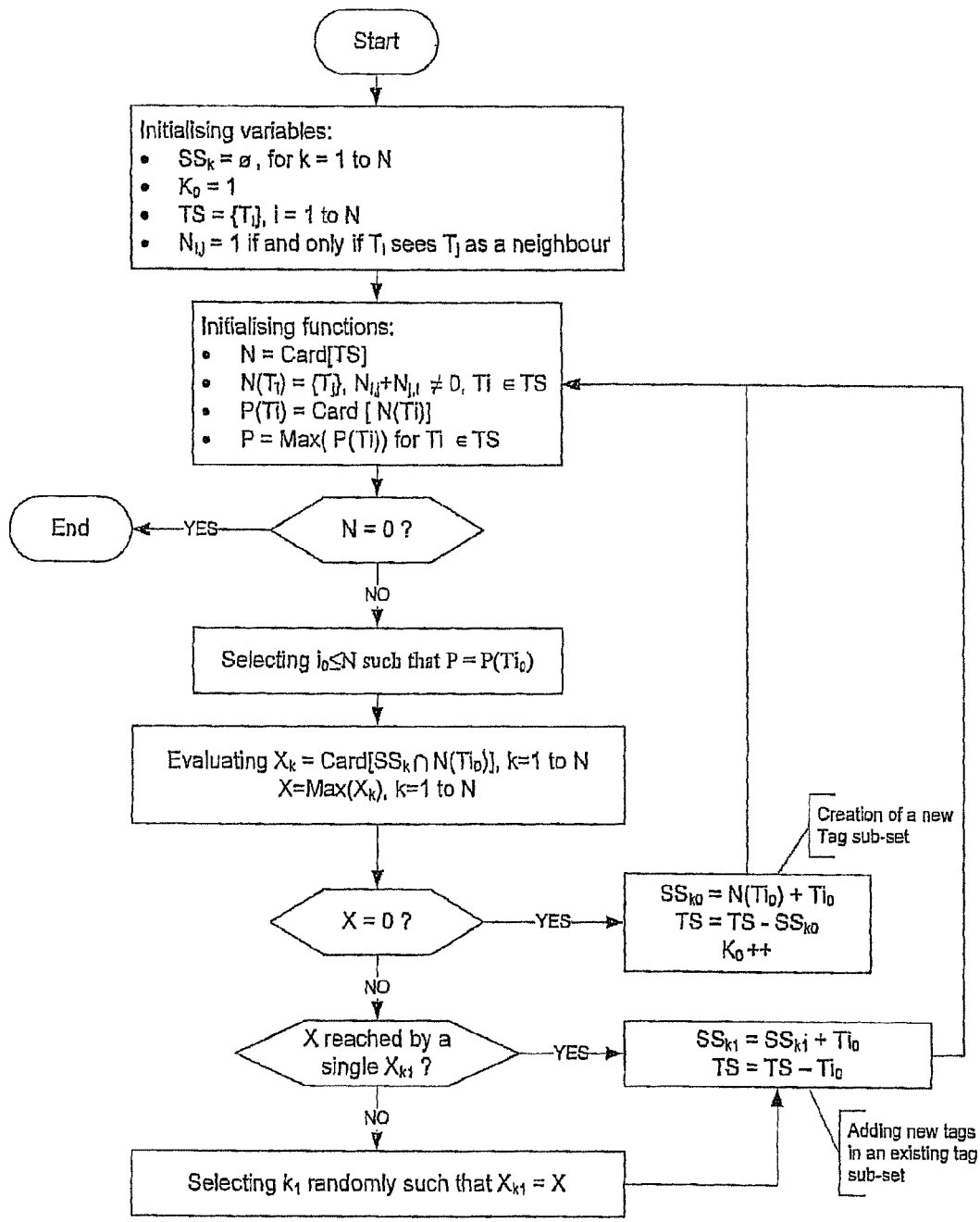
FIG. 10 contains an implementation of the discrimination algorithm functionally described in FIG. 8, in accordance with embodiments of the present invention.

FIG. 8 represents a flow chart (800) that outlines the functional steps of the discrimination algorithm run at the Application Controller (702 of FIG. 7). In addition, FIG. 10 shows an operational implementation of the now described discrimination process.

The discrimination algorithm firstly starts a polling cycle for calibrating the Application Controller. Then, it instructs the Reader (602 of FIG. 6) for screening the tagged items that are located in the range of the reader in order to identify and acquire their characteristics. Such characteristics are the distance between a tagged item responding and the reader, the distance between an adjacent tagged item and the reader and other parameters allowing determination of the reader range limitation as well as the admitted radius distance limit between adjacent tagged items. In addition, other information, like a list of adjacent tagged items with their identification is included in the RFID message when a polling tag responds to the reader. Data about the geographical position between adjacent tagged items can be also provided. After completion of the polling cycle, the characteristics of the acquired tagged items feed the Application Controller and provide the discrimination algorithm with the necessary parameters for initiating the discrimination process.

The discrimination algorithm allows splitting a tagged item population into one or more partitions, each partition containing a set of tagged items (TS) with multiple subsets (SS). Another aspect is to collect the tagged items that are considered as adjacent when located in the same vicinity and to assemble them in a targeted subset. A targeted subset is a group of tagged items that the Application Controller considers as located in the same geographical area or volume. More precisely, the discrimination algorithm may take different decisions while the tag set remains not void.

Firstly, the discrimination algorithm can identify a new subset to be part of the selected partition. The discrimination algorithm creates the subset accordingly with the not yet allocated tagged items and its adjacent tagged items.

Secondly, the discrimination algorithm can add a not yet allocated tagged item with their associated adjacent tagged items to an existing subset.

It is to be noted that depending on the amount of adjacent tagged items assigned to a tagged item, the discrimination algorithm can either create a new subset to be included in the partition or enrich an existing one.

In specific situation, when a tagged item meets multiple partitions then the discrimination algorithm is able to determine automatically the adequate partition for assigning the tagged item.

As already mentioned, the discrimination algorithm firstly starts a polling cycle for calibrating the Application Controller and instructs the Reader for screening the tagged items. Once the Application Controller has identified and acquired the characteristics of the tagged items then the discrimination algorithm is able to run and the process goes to step 802.

Step 802: (Process initialization). The discrimination algorithm initializes the Application Controller and prepares the system for splitting a tagged item population into several distinct partitions, each partition containing a set of tagged items (TS) with multiple subsets (SS). The Application Controller provides the discrimination algorithm with the amount of (i.e., number of) items in the set of tagged items (TS). The amount of items in the set of tagged items (TS) is a function of the tagged item population and a determination of a maximum number of allowed partitions at the supply chain configuration step (not shown here). In addition, the Application Controller determines the number of subsets (SS) to be assembled within one set of tagged items. The number of subsets (SS) depends on the tagged item population, the maximum number of subsets allowed by the system, and the maximum separating distance between the subsets when arranged in the same set of tagged items (TS). Furthermore, the maximum number of subsets (SS) allowed is a function of the size of the set of tagged items (TS). Once, the discrimination algorithm has determined both the set of tagged items (TS) and the subsets (SS) then the process goes to step 804.

Step 804: (Tagged Item acquisition). The discrimination algorithm interprets the information stored in the tagged items through the Application Controller by looping on each tagged item. By iteration of the loop, the discrimination algorithm identifies the tagged items that match the screening criteria as preliminary defined when configuring the Application Controller. Such screening criteria are the distance limitation or/and the reader range or/and other parameters that inform the Application Controller about tagged item geographical characteristics. From the collected information, the discrimination algorithm is able to sort the tagged items and to label them accordingly. Thereby, each individual tagged item can be aggregated in a convenient way to be included into the adequate set of tagged items (TS). Then the process goes to step 806.

Step 806: (Central Tagged Item identification). By exploiting the geographical characteristics in conjunction with the reader range, the discrimination algorithm determines the position of each adjacent tagged item with reference to each individual tagged item that is located within the area and/or volume of measurement, previously defined during the configuration step. The discrimination algorithm scans the tagged items, one after the other, for evaluating the number of adjacent tagged items that are located around each tagged item taken individually. Then the process goes to step 808.

Step 808: A status determines the completion of the identification of the central tagged item. According to the status, the discrimination algorithm stops the scanning process within the area or volume as soon as an identification of a particular tagged item that has a maximum of adjacent tagged items populated around occurs. Then the process goes to step 810 (branch Yes of the comparator 808); otherwise the discrimination algorithm continues the scanning process (Branch No of the comparator 808) and the process loops back to step 806.

Step 810: (Subset instantiation). The discrimination algorithm gets the information related to each central tagged item with its associated adjacent tagged items. Then, the discrimination algorithm selects either a portion of or the entire population of the adjacent tagged items by outlining a virtual boundary range around the selected central tagged item that defines a subset (SS). It is to be noted that, the virtual boundary range can be adjusted at the configuration step allowing the Reader to collect the tagged items at the various radius parameter settings. Consequently, the system creates and instantiates a subset of adjacent tagged items that is associated to a central tagged item and the process goes to step 812.

Going now to step 812, a status determines the completion of the subset (SS) instantiation within the partition containing some sets of tagged items (TS). Based on the status, the discrimination algorithm stops after the instantiation process that runs within the area or volume of measurement detects the final central tagged item. Thus, several subsets (SS) are identified according to the screening criteria. Each subset (SS) contains a central tagged item with the addition of a population of adjacent tagged items located around in the same vicinity. Then the process goes to step 814 (Branch Yes of the comparator 812); otherwise the subset instantiation is not complete (Branch No of the comparator 812) and the process loops back to step 810.

Step 814: A detection of any of the potential missing tagged items is performed at step 814 of the discrimination algorithm. In order to reduce the miss rate of the tagged item discrimination, the radius of the Reader range is configured for satisfying a maximum area and/or volume of measurement. However, due to the intrinsic rounding coverage of the emitted radiation of the Reader, some distant tagged items that are out of the radius range can be missed during the subset instantiation. Consequently, the discrimination algorithm uses the information of the tagged items previously gathered for initiating the detection of the presence of a missing tagged item. Thus, the discrimination algorithm gets the geographical characteristics of tagged items already assigned within a subset (SS) and generates a virtual boundary range that will serve afterwards as a secondary reference when initiating the distance measurement of the missing tagged items. Then a status determines the presence of a potential missing tagged item that is out of the virtual boundary range. If a missing tagged item is detected then the process goes to step 816 (branch Yes of the comparator 814); otherwise there exist no missing tagged items anymore (branch No of the comparator 814) and the process goes to step 818.

Going now to step 816, a status determines that a missing tagged item can be added to an existing subset of tagged items (SS), or not, by the use of the virtual boundary range. According to the status, the discrimination algorithm identifies a missing tag that can be a candidate to be included within an existing subset of tagged items (SS). Then, the discrimination algorithm initiates the Reader for screening the missing tagged items and getting their geographical characteristics. Consequently, the discrimination algorithm determines the separating distance with the aforementioned virtual boundary range. Thereby, the discrimination algorithm identifies which of the distant tagged items that are missed during the subset instantiation can be added into an existing subset. It is to be noted that the maximum distance allowed for determining a separating distance of a missing tagged item with the virtual boundary range is a constraint that is defined during the configuration step within the Application Controller. If the discrimination algorithm determines that a missing tagged item is over of a specified threshold distance representing the maximum distance allowed, then a new subset (SS) is created for receiving the aforementioned missing tagged item (Branch No of the comparator 816); the missing tagged items is therefore considered as a new central tagged item and the process goes to step 806. Otherwise, the separating distance between the missing tagged item and the virtual boundary range of the selected subset of tagged items (SS) does not exceed the maximum distance allowed (Branch Yes of the comparator 816); then the missing tagged item is added into the existing subset (SS) and the process goes to step 810.

Step 818: (Discrimination completion). The discrimination algorithm is complete. The Reader is able to identify a tagged item population that is aggregated into multiple subset of tagged items (SS) within a set of tagged items (TS) in a partition of the packaging supply chain.

Figure 9:
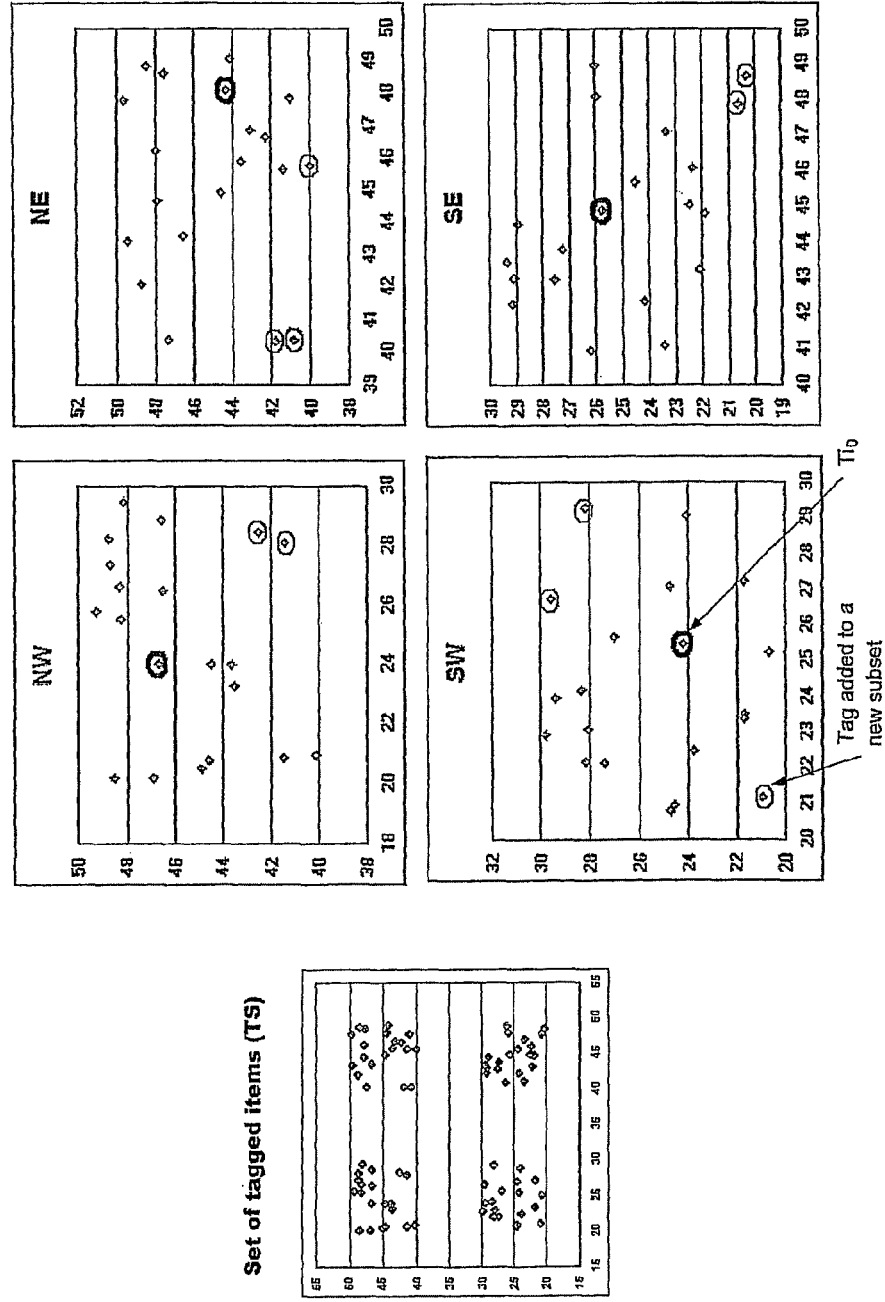
FIG. 9 illustrates a splitting of a tag set into subsets, in accordance with embodiments of the present invention.

Going now to FIG. 9, a symbolic representation of a split of an initial set of tagged items (FIG. 9A) into four subsets (FIG. 9B) is shown.

As explained before, the discrimination algorithm considers a population of tagged items that need to be respectively aggregated in multiple subsets. Each subset is a part of a set of tagged items that belongs to a partition in the packaging supply chain. Thereby, the Reader can easily read a group of tagged items that are located in the same vicinity within a subset with no risk of collision with the other adjacent subsets.

FIG. 9A illustrates a set representing a pallet that is populated with tagged items. In the following example, 80 tagged items (grey dots) are identified in the initial set. The set of the tagged items is arranged in four distinct subsets. Each subset represents a box containing several tagged items. By running the discrimination algorithm, each subset is respectively instantiated as NE (North East), NW (North West), SE (South East) and SW (south West), representing four geographical orientations shown on FIG. 9B.

Thus, FIG. 9B illustrates different cases for which the discrimination algorithm operates when sorting the tagged items according to the screening criteria as defined during the configuration step.

As described before with reference to FIG. 8, the discrimination algorithm first determines the central tagged item 'Tio' that has the maximum of adjacent tagged items populated around. For the purpose of the illustration and the sake of clarity, each central tagged item within its current subset (NE, NW, SE and SW) is highlighted by a bold ellipse, while the adjacent tagged items are the free dots.

Next in the discrimination process, the missing tagged items are searched, and are illustrated on FIG. 9B by simple circle around dots. A missing tagged item is a tagged item that is not considered as an adjacent tagged item having a central tagged item. In such a situation, the discrimination algorithm operates by considering the missing tagged item as adjacent to an adjacent tagged item and therefore checks the separating distance in between. If the discrimination algorithm determines that a missing tagged item is over a predetermined maximum distance from the adjacent tagged item, then the missing tagged item is considered as being located to another subset and a new subset (SS) is created for receiving the aforementioned missing tagged item, as pointed by the arrow 'Tag added to a new subset' in screen SW of FIG. 9B. Otherwise, the discrimination algorithm adds the missing tagged items into the adequate subset (SS).

Finally, it has to be appreciated that while the invention has been particularly shown and described with reference to a preferred embodiment, various changes in form and detail may be made therein without departing from the spirit, and scope of the invention. Particularly, the discrimination algorithm may be implemented using various computation variables. One preferred implementation is provided in FIG. 10. The algorithm is run by the Reader to analyze the information collected from all the different tags, and to build a partition of tag set TS={$T_i$}, where $T_i$ represents a tag with index i varying between the values 1 and N. This partition corresponds to a collection of subsets $SS_k$ where k varies between 1 and the maximal value of N. The algorithm runs as a loop while the tag set TS remains not void. For each loop iteration, the algorithm either: detects a new subset $SS_{k0}$, with members $T_i$, and its neighbors; or adds new members $T_i$ and its neighbors to an already defined subset $Ss_k$.

The criteria used to identify the best tag candidate for either creating a new subset or for expanding an already defined subset, corresponds to the number of tag neighbors. In this particular example where several tags have a neighbor set with the highest size, then an embodiment of the present invention selects randomly one of these tags.

However, in an alternate embodiment, the algorithm may discard these tags in the current loop step, and works on the ones showing the immediately largest neighbor population.

Thus the present invention provides a method for dividing a set of tagged items into subsets, the subsets being established as described supra in conjunction with step 802 of FIG. 8. Each tagged item is tagged with a passive Radio Frequency Identification (RFID) tag. The set of tagged items is located in a specified region having fixed boundaries, such as the region consisting of stocking environment 604 of FIG. 6 or the region consisting of the pallet of tagged items in FIG. 9A. The region may be entirely within a communication range (Rrange) of a RFID reader. For example, in one embodiment the stocking environment 604 of FIG. 6 is within the communication range (Rrange) of the RFID reader 602. In accordance with the polling cycle described supra as occurring before implementation of step 802 of FIG. 8, the RFID reader is instructed to poll the RFID tags of all tagged items in the region to generate information comprising, for each tagged item in the region, a spatial location of each tagged item and a list of all other tagged items in the region which are adjacent to each tagged item by being within a specified constant distance (Rlimit) from each tagged item. The region is split into a plurality of subregions for defining at least one subset of the set of tagged items, such as the subregions denoted as NE, NW, SE, and SW in FIG. 9B. For each subregion, the method determines a central tagged item having more adjacent tagged items in each subregion than any other tagged item in each subregion, in accordance with the procedures for determining central tagged items described supra in conjunction with steps 806 and 808 of FIG. 8, said procedures utilizing the generated information. A virtual boundary is outlined around the central tagged item to enclose the central tagged item and a portion of the tagged items in each subregion which are adjacent to the central tagged item by being within the specified constant distance (Rlimit) of the central tagged item, said virtual boundary defining a subset of the set of tagged items for each subregion as comprising the central tagged item and all other tagged items within the virtual boundary, said portion of the tagged items in each subregion consisting of all, or less than all, tagged items which are adjacent to the central tagged item in each subregion, as described supra in conjunction with step 810 of FIG. 8.

In a particular embodiment, the portion of the tagged items in a first subregion of the plurality of subregions consist of less than all tagged items which are adjacent to the central tagged item in the first subregion, wherein the first subregion comprises an outer tagged item that is not within the virtual boundary and is not adjacent to the central tagged item in the first subregion. Then a first distance is determined between the outer tagged item and the virtual boundary and it is ascertained whether the first distance exceeds a specified threshold distance. If the first distance is ascertained to exceed the specified threshold distance, then a new subset of the set of tagged items is created and the outer tagged item is designated as a central tagged item of the new subset. If the first distance is ascertained to not exceed the specified threshold distance, then the outer tagged item is added to the subset defined by the virtual boundary in the first subregion.

The preceding particular embodiment is described supra in conjunction with step 816 of FIG. 8.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for dividing a set of tagged items into subsets, each tagged item being tagged with a passive Radio Frequency Identification (RFID) tag, said method comprising:

instructing, by a processor of a computer system, a RFID reader to poll the RFID tags of all tagged items in a specified region having fixed boundaries to generate information comprising, for each tagged item in the region, a spatial location of each tagged item and a list of all other tagged items in the region which are adjacent to each tagged item by being within a specified constant distance (Rlimit) from each tagged item, said region being entirely within a communication range (Rrange) of the RFID reader;

said processor splitting the region into a plurality of non-overlapping subregions such that the region consists of the non-overlapping subregions collectively;

said processor determining which tagged item in each subregion is a centered tagged item, said determining which tagged item in each subregion is the centered tagged item comprising utilizing the generated information to determine that the centered tagged item in each subregion has more adjacent tagged items in the subregion containing the centered tagged item than does each other tagged item in the subregion containing the centered tagged item, wherein said utilizing the generated information to determine each centered tagged item comprises utilizing the spatial location of each tagged item in the subregion containing the centered tagged item and the list of all other tagged items in the subregion containing the centered tagged item which are adjacent to each tagged item in the subregion containing the centered tagged item by being within the specified constant distance (Rlimit) from each tagged item in the subregion containing the centered tagged item;

said processor selecting the centered tagged item in each subregion as a central tagged item for each subregion; and said processor outlining a virtual boundary around the central tagged item to enclose the central tagged item and a portion of the tagged items in each subregion which are adjacent to the central tagged item by being within the specified constant distance (Rlimit) of the central tagged item, said virtual boundary defining a subset of the set of tagged items for each subregion as comprising the central tagged item and all other tagged items within the virtual boundary, wherein the portion of the tagged items in each subregion consists of all, or less than all, tagged items which are adjacent to the central tagged item in each subregion.

2. The method of claim 1, wherein the portion of the tagged items in each subregion consist of all tagged items which are adjacent to the central tagged item in each subregion.

3. The method of claim 1, wherein the portion of the tagged items in a first subregion of the plurality of subregions consist of less than all tagged items which are adjacent to the central tagged item in the first subregion.

4. The method of claim 3, wherein the first subregion comprises an outer tagged item that is not within the virtual boundary and is not adjacent to the central tagged item in the first subregion, and wherein the method further comprises:

determining a first distance between the outer tagged item and the virtual boundary;

ascertaining that the first distance exceeds a specified threshold distance;

responsive to said ascertaining, creating a new subset of the set of tagged items and designating the outer tagged item a central tagged item of the new subset.

5. The method of claim 3, wherein the first subregion comprises an outer tagged item that is not within the virtual boundary and is not adjacent to the central tagged item in the first subregion, and wherein the method further comprises:

determining a first distance between the outer tagged item and the virtual boundary;

ascertaining that the first distance does not exceed a specified threshold distance;

responsive to said ascertaining, adding the outer tagged item to the subset defined by the virtual boundary in the first subregion.

6. The method of claim 1, wherein the method comprises:

said RFID reader polling the RFID tags of all tagged items in the region, wherein said polling comprises sending an identification request to the RFID tags of each tagged item in the region, and wherein the identification request comprises an identifier of the RFID tag to which each identification request is sent, a distance between the RFID reader and the RFID tag to which each identification request is sent, and the specified constant distance (Rlimit).

7. The method of claim 6, wherein the said polling comprises the RFID reader transmitting a polling command addressed to a passive RFID tag B in the region, and wherein the method further comprises:

a passive RFID tag A receiving the polling command previously transmitted from the RFID reader and addressed to the passive RFID tag B;

said RFID tag A determining that the polling command is not addressed to the RFID tag A;

in response to the RFID tag A determining that the polling command is not addressed to the RFID tag A, at a time t1 said RFID tag A switching the RFID tag A to a catching mode configured to catch echos from other tags;

said RFID tag A receiving at a time t3 an echo of a message sent by the RFID tag B to the RFID reader in response to the polling command received by the RFID tag B at a time t2, wherein the echo comprises an identification of the RFID tag B, and wherein t3>t2>t1;

said RFID tag A determining a distance (D.t2$t$) between the RFID tag A and the RFID tag B based on a total timing (TT) equal to t3 minus t1;

said RFID tag A ascertaining that the distance D.t2$t$ does not exceed a radius limit consisting of the specified constant distance (Rlimit); and responsive to said ascertaining, said RFID tag storing the identification of the RFID tag B and the distance D.t2$t$ in a database within the RFID tag A.

8. The method of claim 7, wherein the method further comprises:

at a time later than the time t3, said RFID tag A sending an identification message to the RFID reader, wherein the identification message includes an identifier of the RFID tag A, a distance between the RFID tag A and the RFID reader, the radius limit, the identification of the RFID tag B, and the distance D.t2t.

9. The method of claim 7, wherein said determining the distance D.t2t comprises determining D.t2t according to:

$$D.t2t=(TT-T\text{trig}-TE.r2t.\text{tag}B-TE.r2t.\text{tag}A)*C$$

wherein Ttrig is a specified delay that is not less than a sum of a tag access time for reading the polling command and a granted time for processing the polling command, wherein TE.r2t.tagA is a time for the polling command to be transmitted from the RFID reader to the RFID tag A, wherein TE.r2t.tagB is a time for the polling command to be transmitted from the RFID reader to the RFID tag B, wherein the polling command comprises TE.r2t.tagB, and wherein C is the speed of light.

10. A computer program product comprising a computer readable tangible storage device having a computer readable program code embodied in the device, said program code configured to be executed on a processor of a computer system to perform a method for dividing a set of tagged items into subsets, each tagged item being tagged with a passive Radio Frequency Identification (RFID) tag, said method comprising:

said processor instructing a RFID reader to poll the RFID tags of all tagged items in a specified region having fixed boundaries to generate information comprising, for each tagged item in the region, a spatial location of each tagged item and a list of all other tagged items in the region which are adjacent to each tagged item by being within a specified constant distance (Rlimit) from each tagged item, said region being entirely within a communication range (Rrange) of the RFID reader;

said processor splitting the region into a plurality of non-overlapping subregions such that the region consists of the non-overlapping subregions collectively;

said processor determining which tagged item in each subregion is a centered tagged item, said determining which tagged item in each subregion is the centered tagged item comprising utilizing the generated information to determine that the centered tagged item in each subregion has more adjacent tagged items in the subregion containing the centered tagged item than does each other tagged item in the subregion containing the centered tagged item, wherein said utilizing the generated information to determine each centered tagged item comprises utilizing the spatial location of each tagged item in the subregion containing the centered tagged item and the list of all other tagged items in the subregion containing the centered tagged item which are adjacent to each tagged item in the subregion containing the centered tagged item by being within the specified constant distance (Rlimit) from each tagged item in the subregion containing the centered tagged item;

said processor selecting the centered tagged item in each subregion as a central tagged item for each subregion; and said processor outlining a virtual boundary around the central tagged item to enclose the central tagged item and a portion of the tagged items in each subregion which are adjacent to the central tagged item by being within the specified constant distance (Rlimit) of the central tagged item, said virtual boundary defining a subset of the set of tagged items for each subregion as comprising the central tagged item and all other tagged items within the virtual boundary, wherein the portion of the tagged items in each subregion consists of all, or less than all, tagged items which are adjacent to the central tagged item in each subregion.

11. The computer program product of claim 10, wherein the portion of the tagged items in each subregion consist of all tagged items which are adjacent to the central tagged item in each subregion.

12. The computer program product of claim 10, wherein the portion of the tagged items in a first subregion of the plurality of subregions consist of less than all tagged items which are adjacent to the central tagged item in the first subregion.

13. The computer program product of claim 12, wherein the first subregion comprises an outer tagged item that is not within the virtual boundary and is not adjacent to the central tagged item in the first subregion, and wherein the method further comprises:

determining a first distance between the outer tagged item and the virtual boundary;

ascertaining that the first distance exceeds a specified threshold distance;

responsive to said ascertaining, creating a new subset of the set of tagged items and designating the outer tagged item a central tagged item of the new subset.

14. The computer program product of claim 12, wherein the first subregion comprises an outer tagged item that is not within the virtual boundary and is not adjacent to the central tagged item in the first subregion, and wherein the method further comprises:

determining a first distance between the outer tagged item and the virtual boundary;

ascertaining that the first distance does not exceed a specified threshold distance;

responsive to said ascertaining, adding the outer tagged item to the subset defined by the virtual boundary in the first subregion.

15. The computer program product of claim 10, wherein the method comprises:

said RFID reader polling the RFID tags of all tagged items in the region, wherein said polling comprises sending an identification request to the RFID tags of each tagged item in the region, and wherein the identification request comprises an identifier of the RFID tag to which each identification request is sent, a distance between the RFID reader and the RFID tag to which each identification request is sent, and the specified constant distance (Rlimit).

16. A system for dividing a set of tagged items into subsets, each tagged item being tagged with a passive Radio Frequency Identification (RFID) tag, said system comprising:

means for instructing a RFID reader to poll the RFID tags of all tagged items in a specified region having fixed boundaries to generate information comprising, for each tagged item in the region, a spatial location of each tagged item and a list of all other tagged items in the region which are adjacent to each tagged item by being within a specified constant distance (Rlimit) from each tagged item, said region being entirely within a communication range (Rrange) of the RFID reader;

means for splitting the region into a plurality of non-overlapping subregions such that the region consists of the non-overlapping subregions collectively;

means for determining which tagged item in each subregion is a centered tagged item, said determining which tagged item in each subregion is the centered tagged item comprising utilizing the generated information to determine that the centered tagged item in each subregion has more adjacent tagged items in the subregion containing the centered tagged item than does each other tagged item in the subregion containing the centered tagged item, wherein said utilizing the generated information to determine each centered tagged item comprises utilizing the spatial location of each tagged item in the subregion containing the centered tagged item and the list of all other tagged items in the subregion containing the centered tagged item which are adjacent to each tagged item in the subregion containing the centered tagged item by being within the specified constant distance (Rlimit) from each tagged item in the subregion containing the centered tagged item;

means for selecting the centered tagged item in each subregion as a central tagged item for each subregion; and means for outlining a virtual boundary around the central tagged item to enclose the central tagged item and a portion of the tagged items in each subregion which are adjacent to the central tagged item by being within the specified constant distance (Rlimit) of the central tagged item, said virtual boundary defining a subset of the set of tagged items for each subregion as comprising the central tagged item and all other tagged items within the virtual boundary, wherein the portion of the tagged items in each subregion consists of all, or less than all, tagged items which are adjacent to the central tagged item in each subregion.

17. The system of claim 16, wherein the portion of the tagged items in each subregion consist of all tagged items which are adjacent to the central tagged item in each subregion.

18. The system of claim 16, wherein the portion of the tagged items in a first subregion of the plurality of subregions consist of less than all tagged items which are adjacent to the central tagged item in the first subregion.

19. The system of claim 18, wherein the first subregion comprises an outer tagged item that is not within the virtual boundary and is not adjacent to the central tagged item in the first subregion, and wherein the method further comprises:
means for determining a first distance between the outer tagged item and the virtual boundary;
means for ascertaining that the first distance exceeds a specified threshold distance;
means for creating a new subset of the set of tagged items and designating the outer tagged item a central tagged item of the new subset, in response to said ascertaining.

20. The system of claim 18, wherein the first subregion comprises an outer tagged item that is not within the virtual boundary and is not adjacent to the central tagged item in the first subregion, and wherein the method further comprises:
means for determining a first distance between the outer tagged item and the virtual boundary;
means for ascertaining that the first distance does not exceed a specified threshold distance;
means for adding the outer tagged item to the subset defined by the virtual boundary in the first subregion, in response to said ascertaining.

* * * * *